US008806486B2

(12) United States Patent
Martin et al.

(10) Patent No.: US 8,806,486 B2
(45) Date of Patent: Aug. 12, 2014

(54) METHODS AND SYSTEMS FOR MANAGING A VIRTUAL DATA CENTER WITH EMBEDDED ROLES BASED ACCESS CONTROL

(75) Inventors: Denis Martin, Narragansett, RI (US); David Grimes, Cazenovia, NY (US); Thomas Warnock, Syracuse, NY (US); John Dwyer, Syracuse, NY (US)

(73) Assignee: Time Warner Cable Enterprises, LLC., New York, NY (US)

( * ) Notice: Subject to any disclaimer, the term of this patent is extended or adjusted under 35 U.S.C. 154(b) by 209 days.

(21) Appl. No.: 13/223,893

(22) Filed: Sep. 1, 2011

(65) Prior Publication Data
US 2012/0072910 A1 Mar. 22, 2012

Related U.S. Application Data

(60) Provisional application No. 61/379,869, filed on Sep. 3, 2010.

(51) Int. Cl.
| G06F 9/455 | (2006.01) |
| G06F 9/46 | (2006.01) |
| G06F 15/16 | (2006.01) |
| G06F 15/173 | (2006.01) |
| G06F 3/00 | (2006.01) |

(52) U.S. Cl.
USPC ............... 718/1; 718/100; 709/231; 709/238; 715/700

(58) Field of Classification Search
None
See application file for complete search history.

(56) References Cited

U.S. PATENT DOCUMENTS

| 5,870,301 | A  | * | 2/1999 | Yakushiji et al. ............... 700/3 |
| 8,194,674 | B1 | * | 6/2012 | Pagel et al. ................. 370/393 |
| 8,355,344 | B1 | * | 1/2013 | Lounsberry ................. 370/254 |
| 8,402,514 | B1 | * | 3/2013 | Thompson et al. ............. 726/4 |
| 2003/0088604 | A1 | * | 5/2003 | Kuck et al. ....................... 709/1 |
| 2004/0021678 | A1 | * | 2/2004 | Ullah et al. .................. 345/700 |
| 2005/0050480 | A1 | * | 3/2005 | Katla et al. ..................... 716/1 |
| 2007/0016945 | A1 | * | 1/2007 | Bassett et al. ................ 726/11 |
| 2008/0184228 | A1 |   | 7/2008 | Tsao |
| 2009/0083374 | A1 | * | 3/2009 | Saint Clair .................. 709/203 |
| 2009/0172072 | A1 | * | 7/2009 | Smith et al. ................. 709/201 |
| 2009/0288084 | A1 |   | 11/2009 | Astete et al. |
| 2009/0328056 | A1 | * | 12/2009 | McCune et al. ............. 718/105 |
| 2010/0107085 | A1 |   | 4/2010 | Chadwick et al. |
| 2010/0175070 | A1 | * | 7/2010 | Baba ........................... 718/105 |

(Continued)

OTHER PUBLICATIONS

International Search Report and Written Opinion in corresponding International Application No. PCT/2011/050195 mailed Dec. 23, 2011.

(Continued)

*Primary Examiner* — Adam Lee
(74) *Attorney, Agent, or Firm* — Patent Portfolio Builders PLLC

(57) ABSTRACT

Embodiments provide techniques for customers to easily, quickly and remotely manage their virtual data centers. Using, for example, a "single pane of glass" GUI view which shows all of the components (including e.g., machines (cpu and RAM), network services (load balancers, firewalls, network address translation, IP management) and storage) of their virtual data centers, provides a complete overview and a starting point for system or component management. According to embodiments, a Roles Based Access Control (RBAC) system is provided which simulates the organizational structure and workflow of a typical IT department to enable workflow management via the GUI for any component or function of a customer's virtual data center.

40 Claims, 32 Drawing Sheets

(56) References Cited

U.S. PATENT DOCUMENTS

| | | | |
|---|---|---|---|
| 2010/0306585 A1* | 12/2010 | Richter et al. | 714/16 |
| 2011/0004708 A1* | 1/2011 | Kondo et al. | 710/38 |
| 2011/0154092 A1* | 6/2011 | Dash et al. | 714/2 |
| 2011/0154320 A1* | 6/2011 | Verma | 718/1 |
| 2011/0173370 A1* | 7/2011 | Jacobs et al. | 711/6 |
| 2011/0184993 A1* | 7/2011 | Chawla et al. | 707/802 |
| 2011/0209145 A1* | 8/2011 | Chen et al. | 718/1 |
| 2011/0265188 A1* | 10/2011 | Ramaswamy et al. | 726/28 |

OTHER PUBLICATIONS

International Preliminary Report on Patentability in corresponding International Application No. PCT/2011/050195 mailed Feb. 20, 2014.

* cited by examiner

FIG. 26

| NaviCloud – AppCenter | + | | | | | | | Logout |
|---|---|---|---|---|---|---|---|---|

NaviCloud
Managed Cloud Services

| Servers | Network | Resources | Account | Admin | | | | Intech ▽ |
|---|---|---|---|---|---|---|---|---|
| Configure & manage VM's | Configure & manage network | Configure & manage global resource | Account Preferences | User & Role Management | | | | |

| Approvers | Workflow | Users | Policy |
|---|---|---|---|

Approvers

Authorization Templates

Authorization Templates
A named matrix of actions mapped to approvals that can be granted by roles using this template. These are the templates that are used to make Roles. Think of this as the "rubber stamps" that can be used by a Role.

ServerAdmin ▽  [New] [Delete]
Object Type: Virtual Machine

| Action | Financial | Executive | Administrative | Technical |
|---|---|---|---|---|
| Power On | ☐ | ☐ | ☐ | ☑ |
| Power Off | ☐ | ☐ | ☐ | ☑ |
| Suspended | ☐ | ☐ | ☐ | ☐ |
| Clone | ☐ | ☐ | ☐ | ☑ |
| Delete | ☐ | ☐ | ☐ | ☐ |
| Restart | ☐ | ☐ | ☐ | ☑ |
| Reconfigure | ☐ | ☐ | ☐ | ☐ |
| Guest Shut Down | ☐ | ☐ | ☐ | ☑ |
| Guest Reboot | ☐ | ☐ | ☐ | ☐ |
| Geust Standby | ☐ | ☐ | ☐ | ☐ |
| Template | ☐ | ☐ | ☐ | ☐ |
| Coverts to VM | ☐ | ☐ | ☐ | ☐ |
| Enter Airlock | ☐ | ☐ | ☐ | ☐ |
| Exit Airlock | ☐ | ☐ | ☐ | ☐ |

[Save] [Save As]

2600

METHODS AND SYSTEMS FOR MANAGING A VIRTUAL DATA CENTER WITH EMBEDDED ROLES BASED ACCESS CONTROL

RELATED APPLICATION

The present application is related to, and claims priority from, U.S. Provisional Patent Application Ser. No. 61/379,869, filed on Sep. 3, 2010, entitled "Virtual Data Center Configuration and Control System", the disclosure of which is incorporated here by reference.

TECHNICAL FIELD

The present invention relates generally to data centers and, in particular, to methods, systems, devices and software for controlling and configuring data centers and components thereof via the Internet.

BACKGROUND

Many enterprise level entities have, for a number of years, outsourced various information technology (IT) services to companies which provide and manage data centers. Such data centers can, for example, configure, manage, upgrade and provide other outsourced IT services relative to hardware and software which are needed by such entities to perform the numerous IT tasks which keep their respective businesses operating. Such services include network management, server setup and maintenance, server upgrades, network security, and a host of other services.

Conventionally, interaction with data centers was not highly automated. When a data center's customer wanted to, for example, modify the network configuration of the system which was being provided to them on an outsourced basis by a data center, it was common for someone in the customer's IT department to contact the data center either via telephone, email or via a portal where the customer would sign in with credentials to request the change. A change ticket was established pursuant to the data center's established procedures, the ticket placed in a processing queue and the modifications would then be implemented by data center personnel in due course.

Additionally, the physical hardware which embodied the IT resources/services which were provided to a data center's customers typically were purchased by the data center for a particular customer and allocated directly to that customer. With the advent of cloud computing, which provides (among other things) a disassociation between physical hardware and specific users of that hardware, as well as a greater potential for customers to scale their IT processing bandwidth needs based on a variety of factors such as cost, time of day, etc., customers of data centers also desire more direct control over their outsourced network management services.

SUMMARY

Among other things, embodiments provide techniques for customers to easily, quickly and remotely manage their virtual data centers. Using, for example, a "single pane of glass" GUI view which shows all of the components (including e.g., machines (cpu and RAM), network services (load balancers, firewalls, network address translation, IP management) and storage) of their virtual data centers, provides a complete overview and a starting point for system or component management. According to embodiments, a Roles Based Access Control (RBAC) system is provided which simulates the organizational structure and workflow of a typical IT department to enable workflow management via the GUI for any component or function of a customer's virtual data center.

According to one exemplary embodiment, a virtual data center control system includes: a web server or module configured to generate a user interface which enables users to control elements of said virtual data center by instructing said virtual data center control system to perform tasks, said tasks including synchronous tasks and asynchronous tasks, an application server or module configured to receive and execute said asynchronous tasks and to generate completed asynchronous task commands, an interface configured to receive synchronous task commands and said asynchronous task commands and configured to transform said synchronous task commands and said asynchronous task commands into one of a plurality of different hypervisor layer commands, and to transmit said transformed commands toward a respective hypervisor layer.

According to one exemplary embodiment, a virtual data center control system includes: a web server or module configured to generate a user interface which enables users to control elements of said virtual data center by instructing said virtual data center control system to perform tasks, said tasks including synchronous tasks and asynchronous tasks, an application server or module configured to receive and execute said asynchronous tasks and to generate completed asynchronous task commands, an interface configured to receive synchronous task commands and said asynchronous task commands and configured to transform said synchronous task commands and said asynchronous task commands into one of a plurality of different hypervisor layer commands, and to transmit said transformed commands toward a respective hypervisor layer, wherein said user interface includes a user interface for enabling receipt of commands to perform any combination of: create a virtual machine, configure a virtual machine, configure a network of virtual machines, establish role-based access to said virtual data center and monitor resource usage of said virtual data center.

According to another embodiment, a roles-based access control (RBAC) method for a virtual data center includes the steps of generating a user interface enabling control of the virtual data center, receiving, via the user interface, a command to initiate a virtual data center control activity, determining whether the virtual data center control activity involves one or more asynchronous tasks, scheduling, by a job engine, the one or more asynchronous tasks associated with the virtual data center control activity, and updating the user interface in response to a status of the virtual data center control command.

According to another embodiment, a virtual data center control system includes a web server configured to generate a user interface (UI) which enables a user to remotely control elements of the virtual data center by instructing the virtual data center control system to perform an activity associated with any of the elements, the elements including virtual machines and at least one firewall, and an application server configured to receive a request to perform the activity from the web server and configured to execute one or more tasks which implement the activity.

According to another exemplary embodiment, a method for remotely controlling a virtual data center includes the steps of generating, by a server, a user interface enabling control of the virtual data center, wherein the user interface includes control elements which enable a user to control functions associated with virtual machines and firewalls, receiving, at the server via the user interface, a command to initiate a virtual data center control activity associated with one of the virtual machines and at least one firewall, and executing, by the server, one or more tasks to implement the virtual data center control activity.

BRIEF DESCRIPTION OF THE DRAWINGS

The accompanying drawings illustrate exemplary embodiments, wherein:

FIGS. 3-27 are screen shots illustrating various graphical user interface (GUI) screens which enable customers to configure, monitor and control their information technology (IT) resources according to an exemplary embodiment;

ACRONYM LIST

AJAX Asynchronous JavaScript And XML
API Application Program Interface
FW Firewall
GUI Graphical User Interface
HTTP Hypertext Transport Protocol
JSON Java Script Object Notation
LB Load Balancer
NAT Network Address Translation
RBAC Roles Based Access Control
SOAP Simple Object Access Protocol
SQL Structured Query Language
VM Virtual Machine

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Among other things, embodiments provide techniques for customers to easily, quickly and remotely manage their virtual data centers. Using, for example, a "single pane of glass" GUI view which shows all of the components (including e.g., machines (cpu and RAM), network services (load balancers, firewalls, network address translation, IP management) and storage) of their virtual data centers, provides a complete overview and a starting point for system or component management. According to embodiments, a Roles Based Access Control (RBAC) system is provided which simulates the organizational structure and workflow of a typical IT department to enable workflow management via the GUI for any component or function of a customer's virtual data center.

Figure 1:
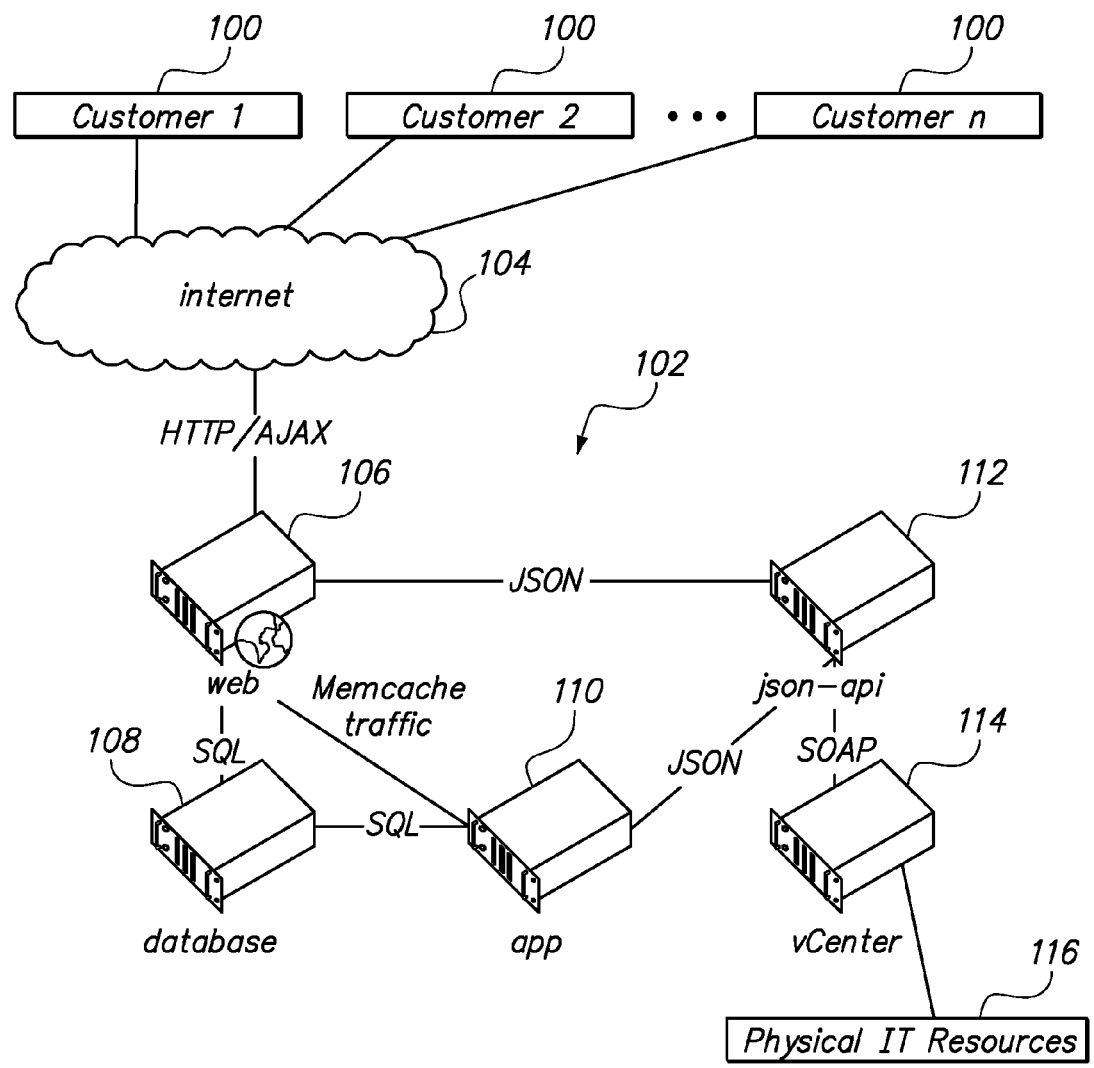
FIG. 1 illustrates an architecture for a data center configuration and control system according to an exemplary embodiment.

In order to provide some context for this discussion, FIG. 1 illustrates an architecture according to exemplary embodiments of the present invention which enables customers to more directly control and configure their remote IT resources, e.g., whether such resources are cloud computing resources or more conventional data center resources. Therein, a plurality of data center customers 100 are connected to the system 102 via an internet connection 104 (and a web browser running on a suitable device, e.g., a personal computer, mobile phone, PDA, etc.). Each customer 100's web browser, when pointed to the IP address of the data center's service portal, displays a detailed graphical user interface (GUI) which enables each customer to control all aspects of their network configuration and operation via the internet 104, e.g., enabling the customer to manage installation of the (virtualized) hardware, configuration of firewalls, configuration of load balancers, etc. Detailed examples of GUIs, which provide customers with a virtual view of their resource pool and access to manage these, and other aspects of their IT resources, on their own according to these exemplary embodiments are provided below with respect to FIGS. 3-27.

A web server 106 operates to generate the GUI toward each customer 100 and to handle inputs from the customers which are processed by the system 102. A database 108 is connected to the web server 108 to, for example, store and provide the data associated with each customer's network configuration. According to this exemplary embodiment, system 102 provides two processing paths for incoming network configuration commands which are received by the web server 106 via the GUI—a first path toward an application server 110 for asynchronous tasks and a second path toward an interface unit 112 for handling synchronous tasks. In this context, "synchronous tasks" refer to those network management/configuration tasks which can be performed by system 102 more or less immediately, while "asynchronous tasks" refer to those tasks which will have some delay associated with their completion, e.g., because they may require some human intervention. Synchronous tasks include things like creating groups and subgroups of hardware elements. Asynchronous tasks include things like setting up servers, configuring firewalls, load balancing, and powering on/off equipment, etc. More examples of synchronous and asynchronous tasks according to embodiments are provided below.

Once the delays associated with processing asynchronous tasks are resolved, these network configuration commands are also passed to the interface unit 112. Interface unit 112 provides system 102 with the capability to be technology agnostic, in the sense that system 102 is capable of working with any commercially available hypervisor layer, represented in this example by vCenter 114. However it should be appreciated by those skilled in the art that the hypervisor layer represented by vCenter 114 could be implemented using any hypervisor technology, e.g., Xen hypervisor, KVM hypervisor or Hyper V hypervisor technology and that interface 112 is specifically designed to be able to translate network configuration commands received from the GUI associated with system 102 into appropriate commands for each of these (and other) hypervisor technologies so as to provide an agnostic abstraction layer between the virtualization used for the IT resources and the control thereof. For completeness, the physical IT resources 116 which are virtualized by hypervisor 114 are also shown.

Figure 2:
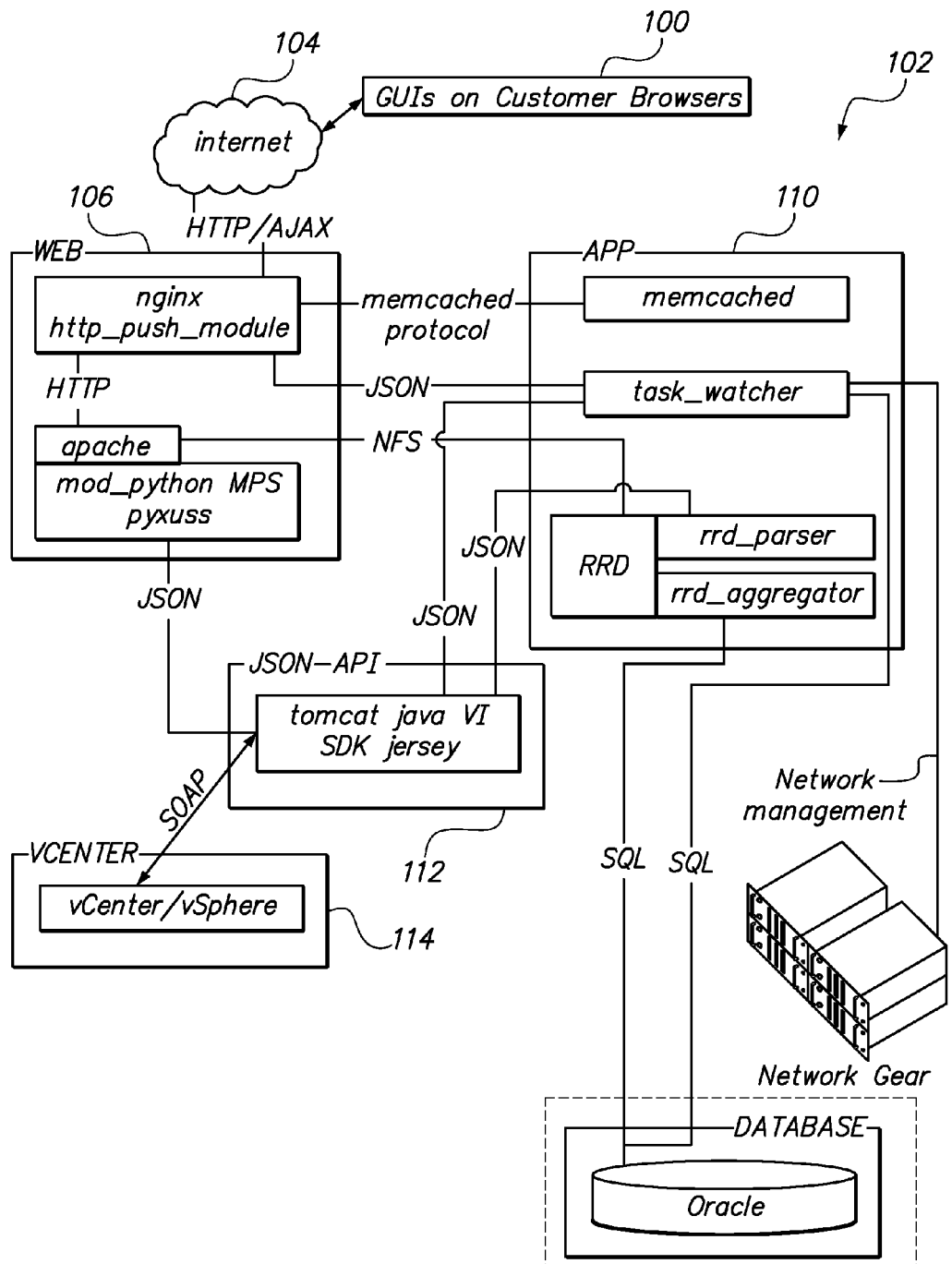
FIG. 2 illustrates the architecture of FIG. 1 in more detail according to an exemplary embodiment.
Figure 3:
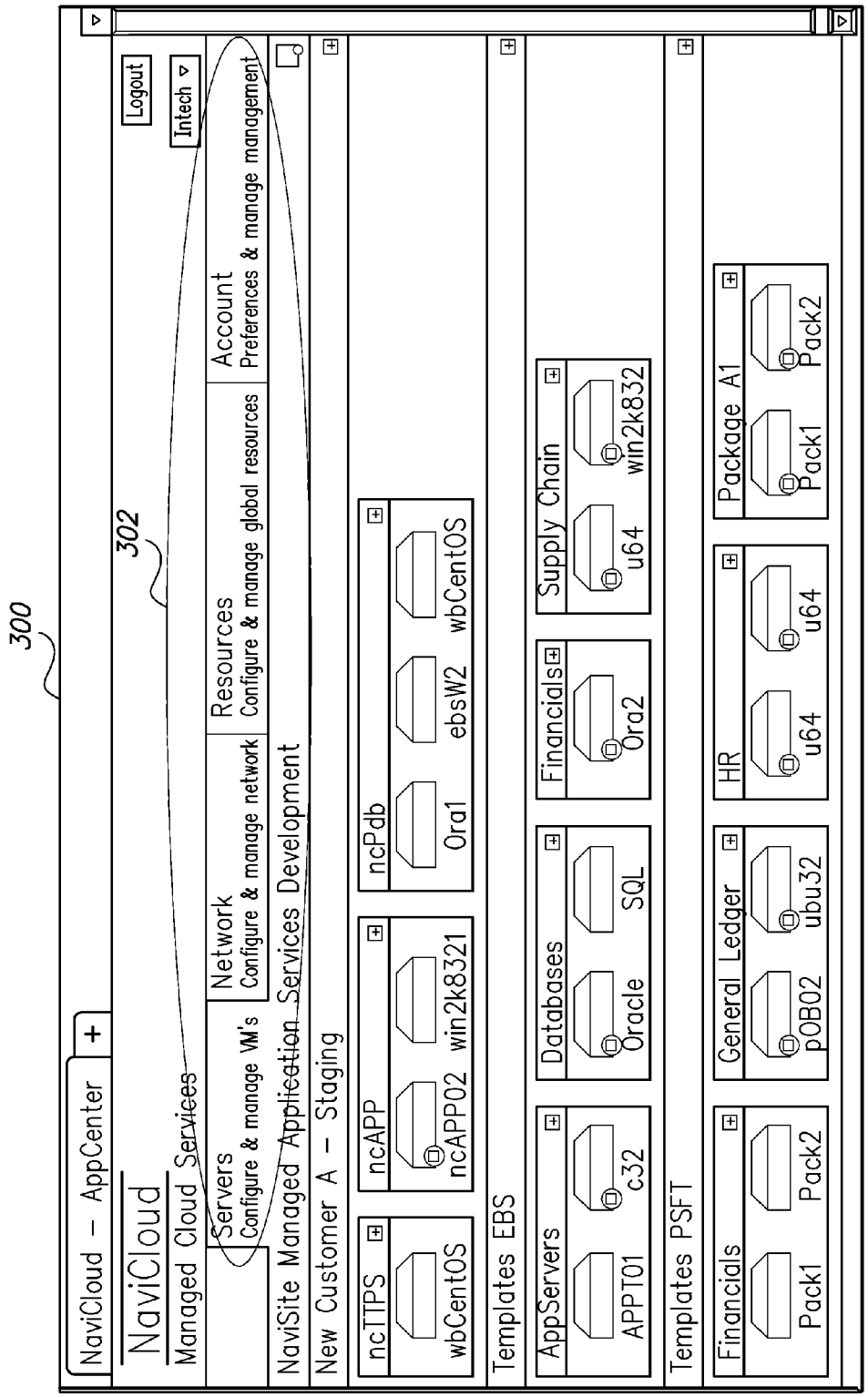

FIG. 2 depicts the exemplary architecture of FIG. 1 in more detail, along with exemplary interfaces and code modules. Of particular interest in FIG. 2 is the task watcher 200 (also referred to herein as a "job engine") which operates as a scheduler to manage, for example, two types of transactions on behalf of users according to this embodiment, i.e., jobs and tasks. In this context, tasks are atomic actions, while jobs are a collection of tasks which have a predetermined sequencing. Collectively, jobs and tasks are sometimes referred to herein as "activities". An example of a job is to evaluate whether a user is permitted to make a firewall rule change and then manage the state of that firewall in the virtual data center accordingly. An example of a task is to power on a machine in the virtual data center. Both tasks and jobs can be synchronous or asynchronous.

A list of exemplary asynchronous and synchronous jobs and tasks which can be performed by system 102 according to an embodiment is provided below.

| Asynchronous | Synchronous |
| --- | --- |
| Add LB | |
| Add Server(LB) | |
| Clone | |
| Clone NaviSite Template | |
| CloneMulti Group | |
| CloneMulti SubGroup | |
| CloneMulti VM | |
| Console | |
| Convert to VM | |
| | Create Group |
| | Create Server Environment |
| | Create Service |
| | Create SubGroup |
| Create/Modify FW Rule | |
| Delete FW Rule | |
| | Delete Group |
| Delete LB | |
| | Delete Server Environment |
| Delete Server(LB) | |
| Delete Service | |
| | Delete SubGroup |
| Delete VM | |
| | Details |
| Enter Airlock | |
| Exit Airlock | |
| Guest Reboot | |
| Guest Shut Down | |
| Guest Standby | |
| Manage Me - Agent Based Replication | |
| Manage Me - Disk Backup | |
| Manage Me - Manage | |
| Manage Me - Monitoring | |
| Manage Me - Remove Agent Based Replication | |
| Manage Me - Remove Disk Backup | |
| Manage Me - Remove Management | |
| Manage Me - Remove Monitoring | |
| Manage Me - Remove Tape Backup | |
| Manage Me - Tape Backup | |
| | Move Group |
| | Move Server Environment |
| | Move SubGroup |
| | Move VM OVF |
| Power Off | |
| Power On | |
| Reconfigure VM | |
| | Rename Group |
| | Rename Server Environment |
| | Rename SubGroup |
| Restart | |
| VM Suspend Template | |

It will be appreciated, however, by those skilled in the art that the foregoing list is purely exemplary and that other tasks and/or jobs may be performed by system 102 to manage a user's virtual data center and that the designation of tasks and jobs as synchronous or asynchronous may vary from embodiment to embodiment However according to some exemplary embodiments it may be preferable to implement more jobs or tasks as asynchronous jobs or tasks as opposed to synchronous jobs or tasks to improve the general user experience, e.g., after a user initiates a first remote virtual data center activity command via the user interface which is implemented by the system as a first asynchronous job or task, she or he can continue on to initiate other activities without having to wait for the first job or task to be completed—instead the system handles the asynchronous job or task in the background and alerts the user when it has been completed (optionally providing visual feedback in the UI regarding the progress of that asynchronous job or task toward completion. Additionally, when roles-based access control is implemented according to some embodiments, the execution of tasks by the system associated with determining whether the virtual data center activity is authorized to be performed may take some time, during which time it is beneficial to permit the requesting user to perform other tasks via the user interface.

Figure 20:
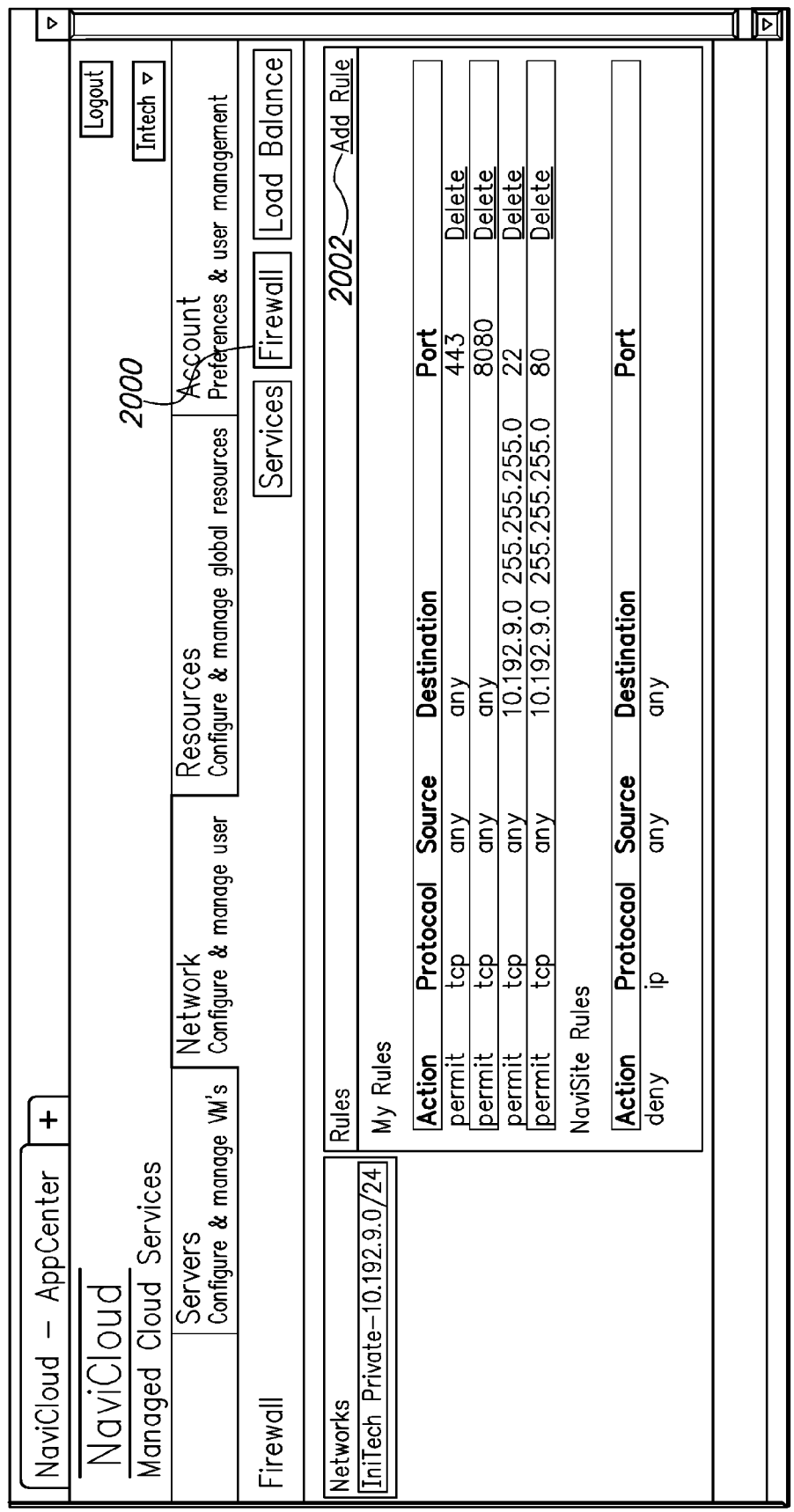
Figure 21:
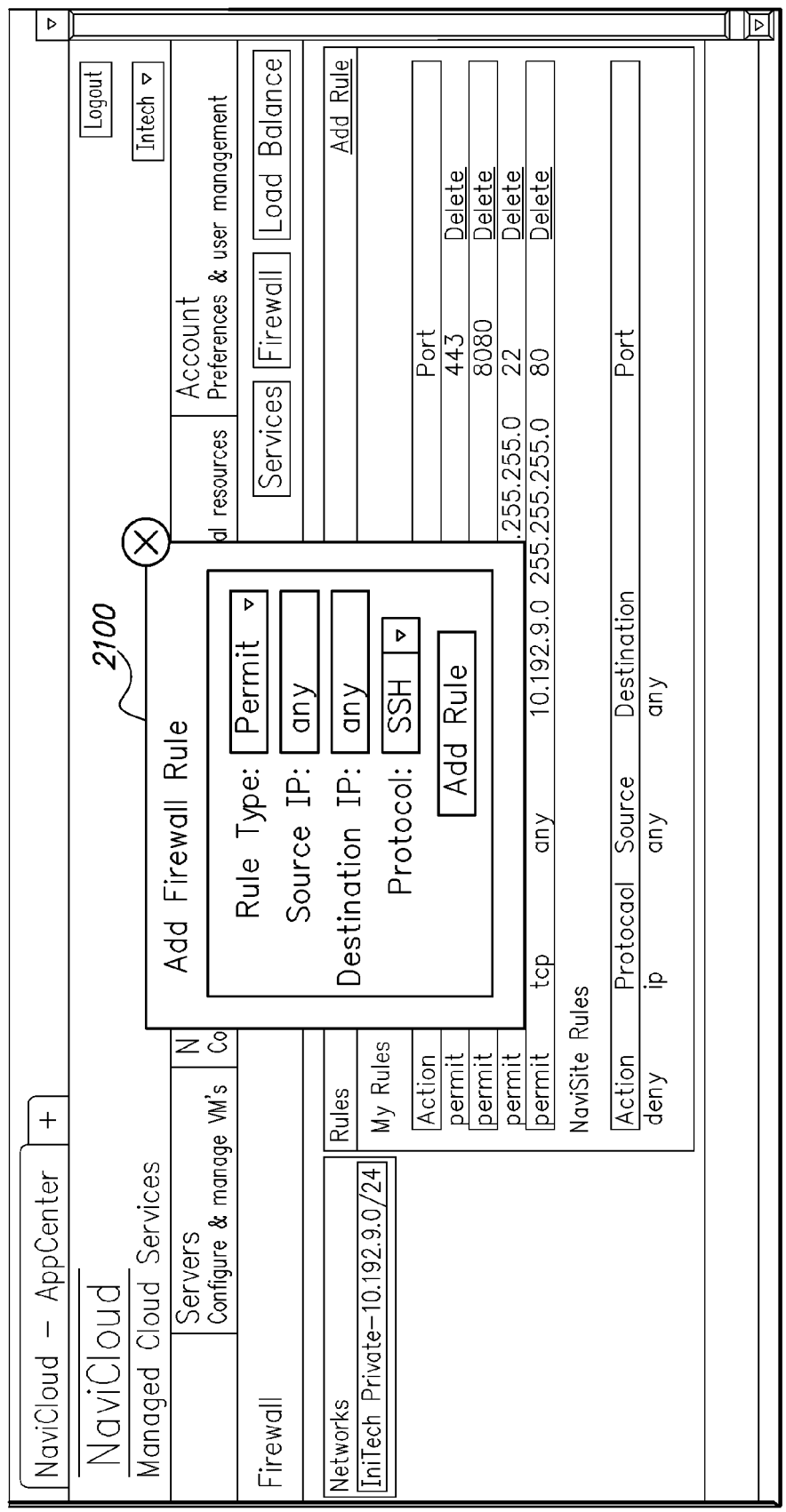
Figure 22:
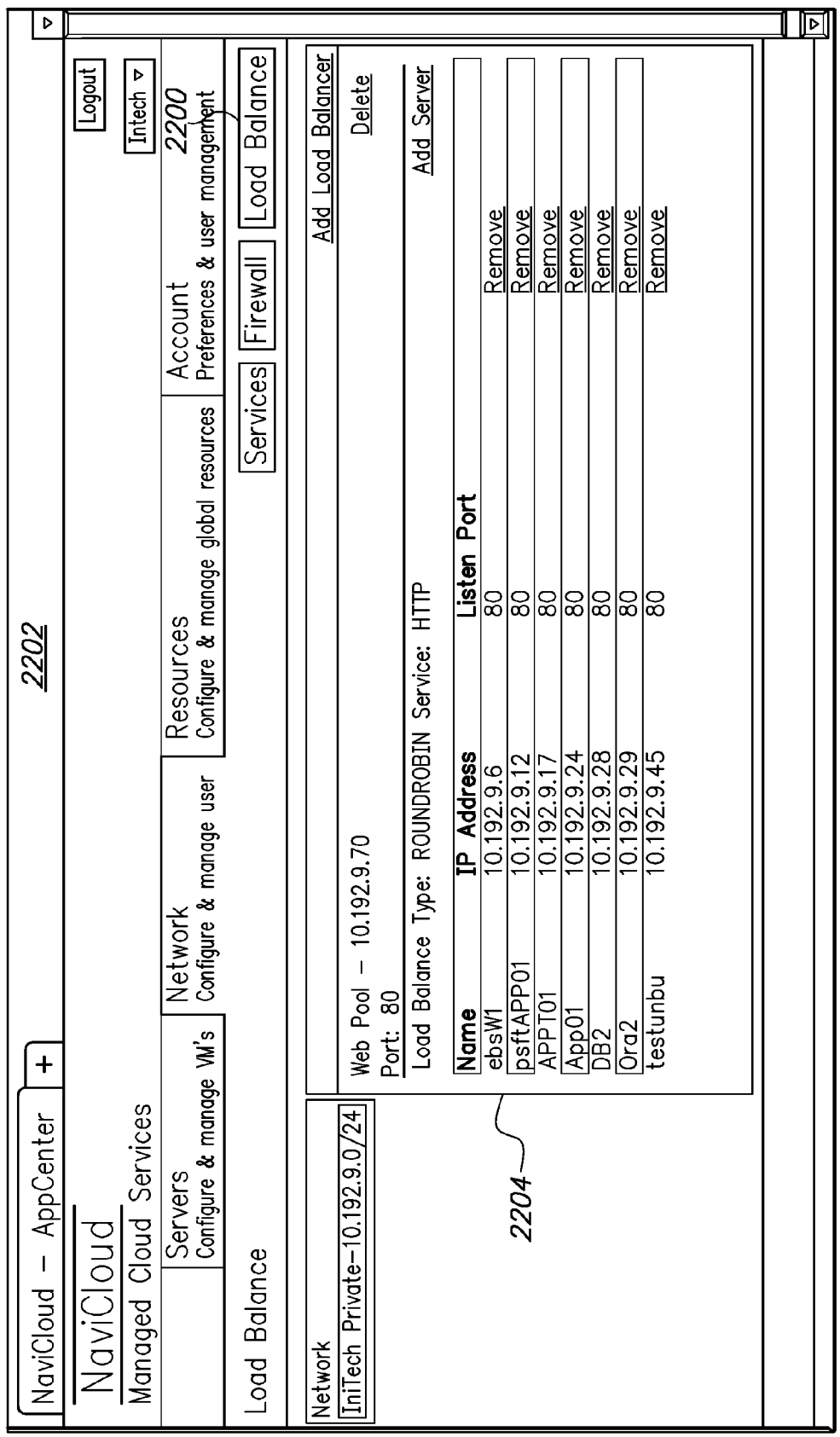
Figure 23:
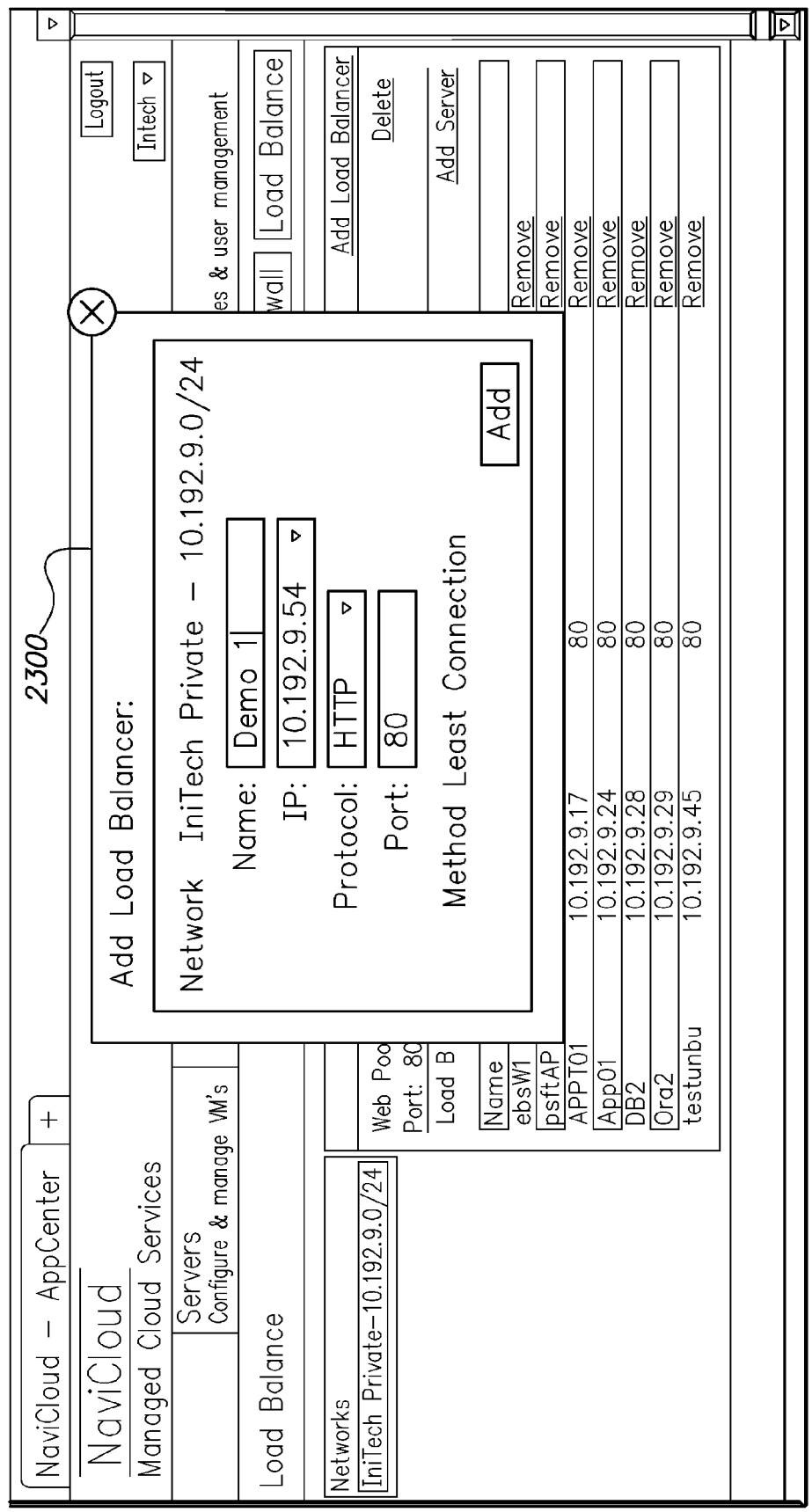

A job may have include both synchronous tasks and asynchronous tasks. Suppose, for example, that a user wishes to perform a virtual data center control activity to modify a firewall rule, which is described in more detail from the GUI perspective below with respect to FIGS. 20 and 21. For this job, the first task is a synchronous task which involves data gathering in response to the request and presentation of that data to the user. For example, when a user clicks on a firewall UI element, e.g., a firewall tab, in order to obtain the firewall configuration information shown in FIG. 20, the system 102 can communicate requests from the web server 106 to the application server 110 to the network gear illustrated in FIG. 2. Alternatively, when a user wants to power on a virtual machine, the system 102 can communicate requests from the web server 106 to the application server 110 to the JSON server 112 to the virtual data center via hypervisor layer 114. Once the firewall configuration information is retrieved, it can be promulgated back through these same elements and presented as shown in FIG. 20 to the user. Once the user enters the data needed to actually modify a firewall rule, e.g., as shown in FIG. 21, the resulting transmission of that command back to the system 102 via web server 106 triggers an asynchronous task associated with actually modifying the firewall rule managed by the task watcher 200, e.g., determining whether the requester has a suitable permission level such that the request is authorized.

Figure 4:
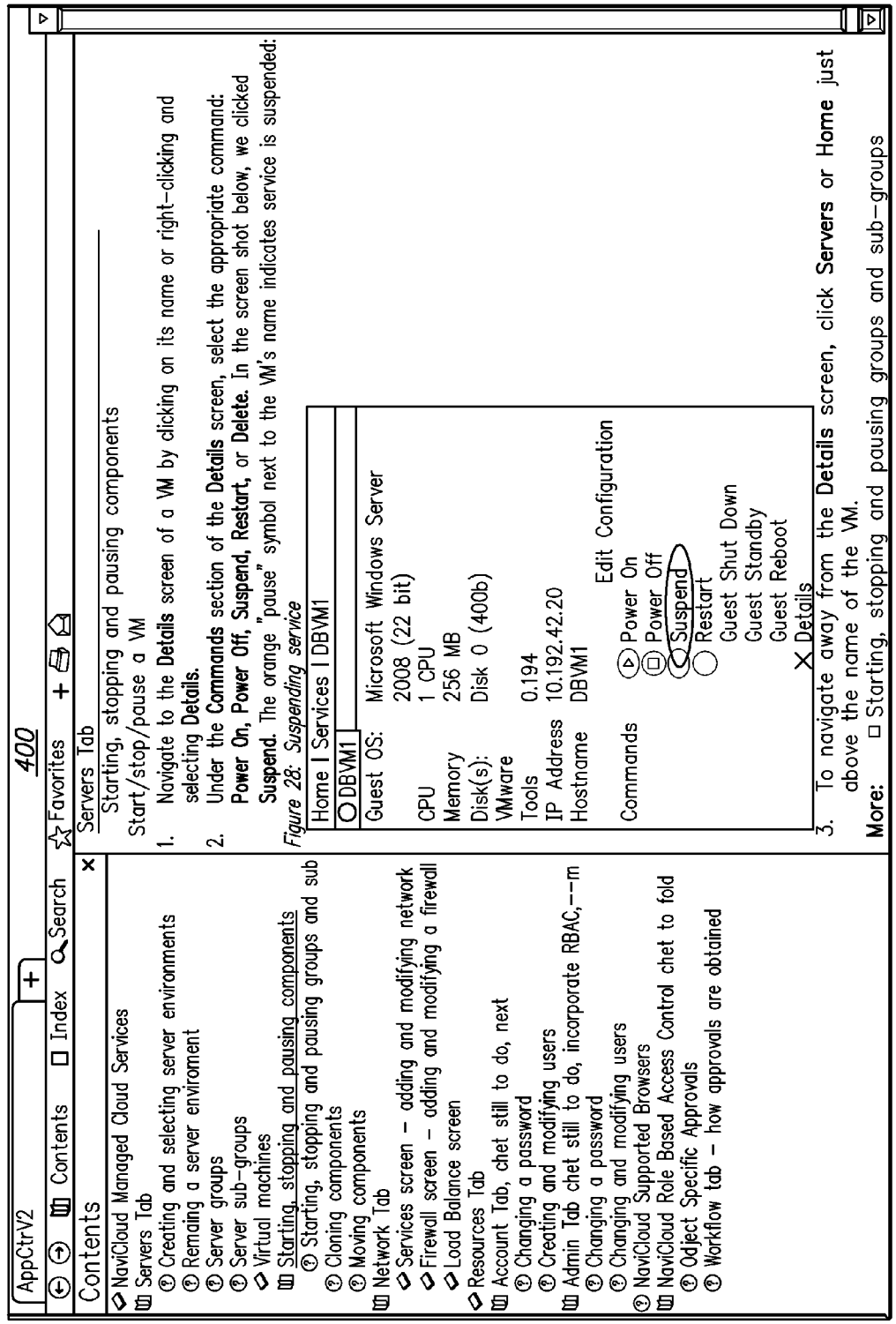

The functionality of the system 102, and the management of the above-listed synchronous and asynchronous tasks and jobs may be best understood by describing the GUI by which customers 100 interact with the system 102 to control their IT resources. One aspect of these exemplary embodiments is to provide a comprehensive mechanism by way of which customers 100 can remotely manage, control and configure all of the important elements and parameters of their IT resources, as will be seen by the following GUI discussion. Starting with GUI screen 300 shown in FIG. 3, therein a set 302 of tab views (four in this exemplary embodiment—"Servers", "Network", "Resources" and "Account", five in another exemplary embodiment described below) are provided on the customer's browser. In aggregate, these four (or five) tabs 302 provide the user with the capability according to exemplary embodiments to manage all of the components in their portion of the physical data center, i.e., their virtual data center. For example, and as discussed in more detail below with respect to different GUI screens, the "Servers" tab 302 provides a user interface which enables customers to, for example, add or remove servers to or from their virtual data center, the "Network" tab 302 provides a user interface which enables customers to selectively expose their IT resources to the public network, e.g., the internet 104, managing fire wall rules, and managing load balancers and their interaction with one another, the "Resources" tab 302 provides a customer view for billing and performance of the virtual data center, and the "Account" tab 302 provides for roles based access as described in more detail below. FIG. 4 illustrates an exemplary GUI screen 400 illustrating available online documentation associated with operation of the system 102.

Figure 5:
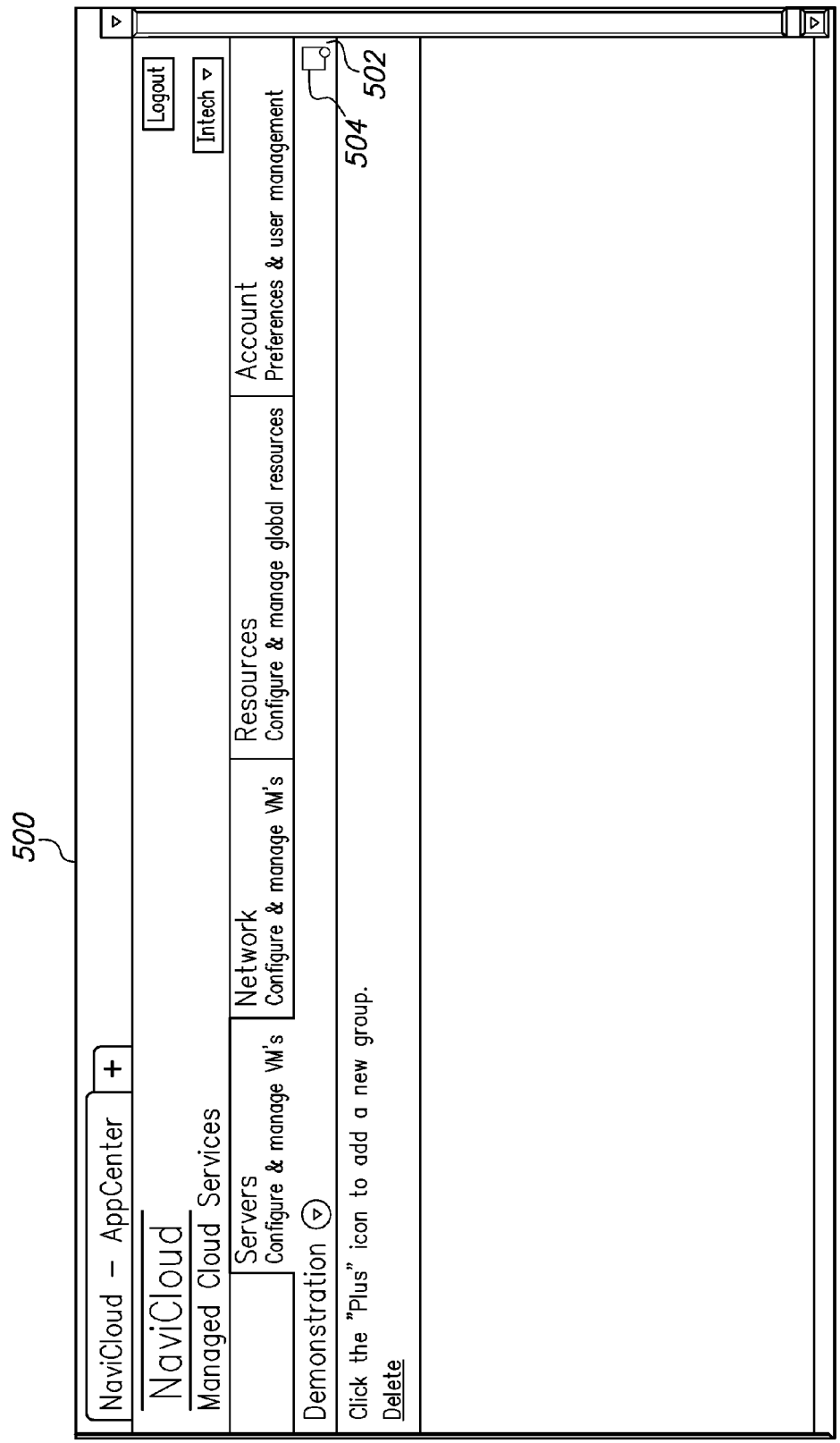
Figure 6:
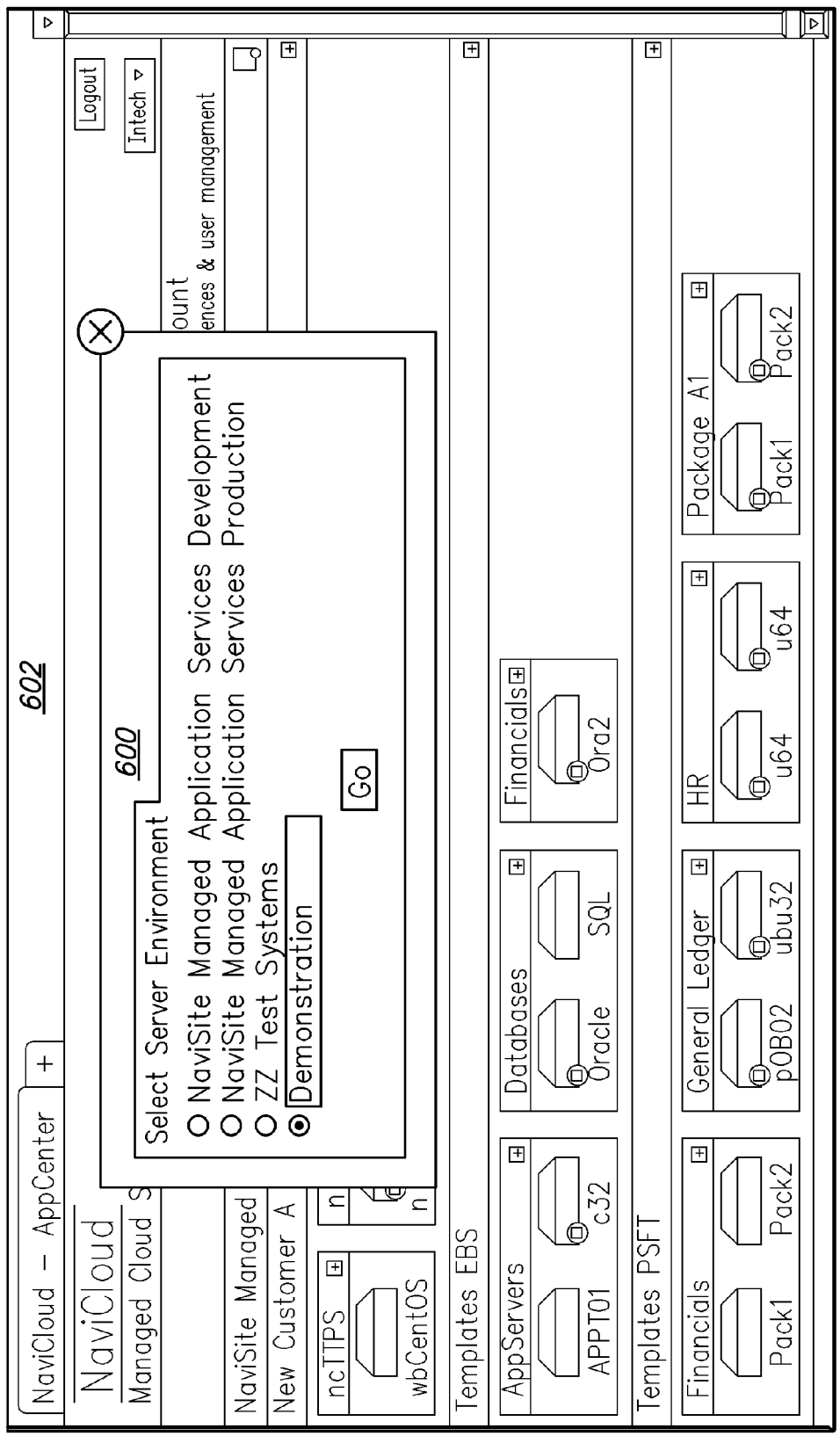
Figure 7:
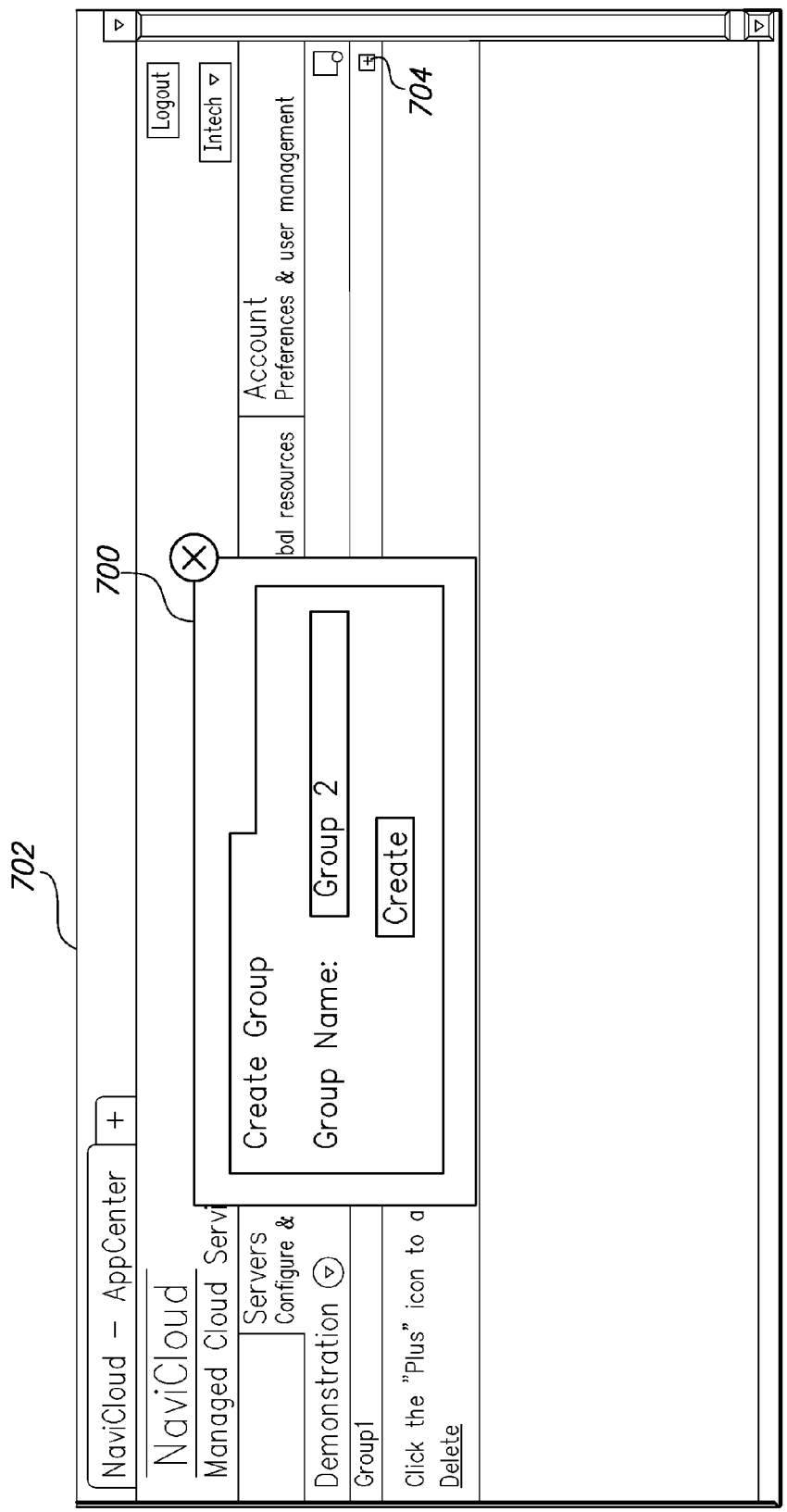
Figure 8:
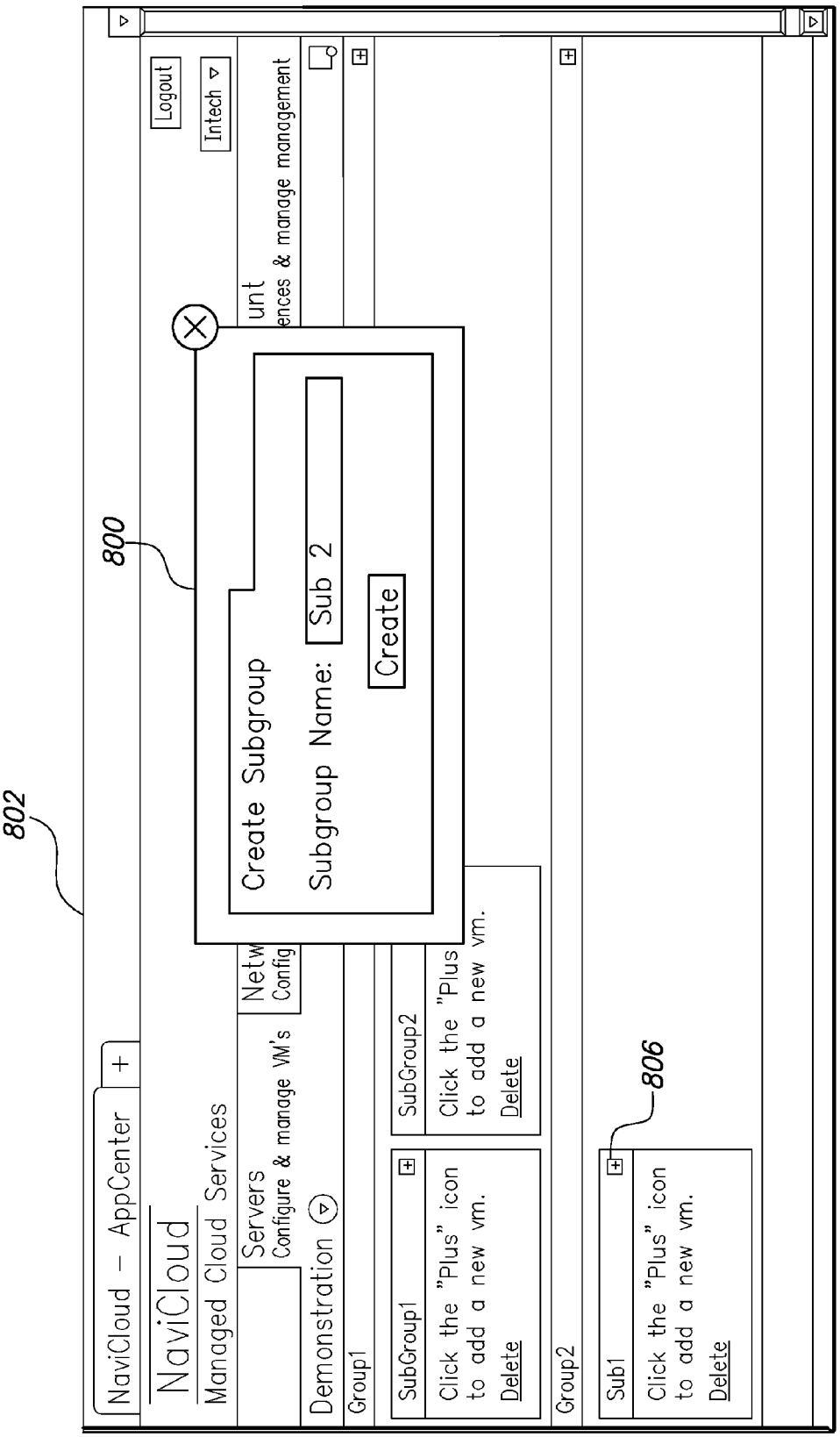
Figure 9:
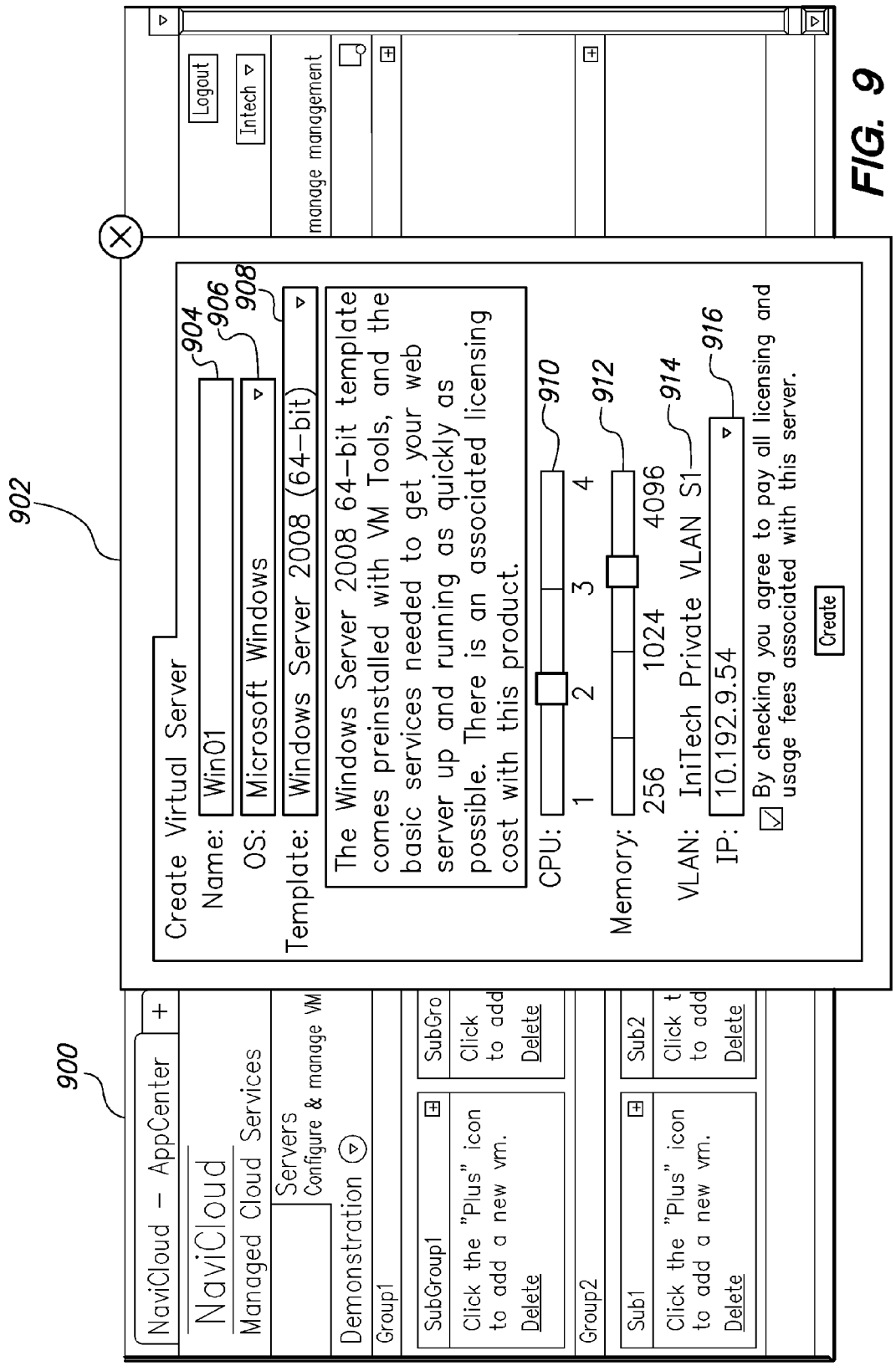
Figure 10:
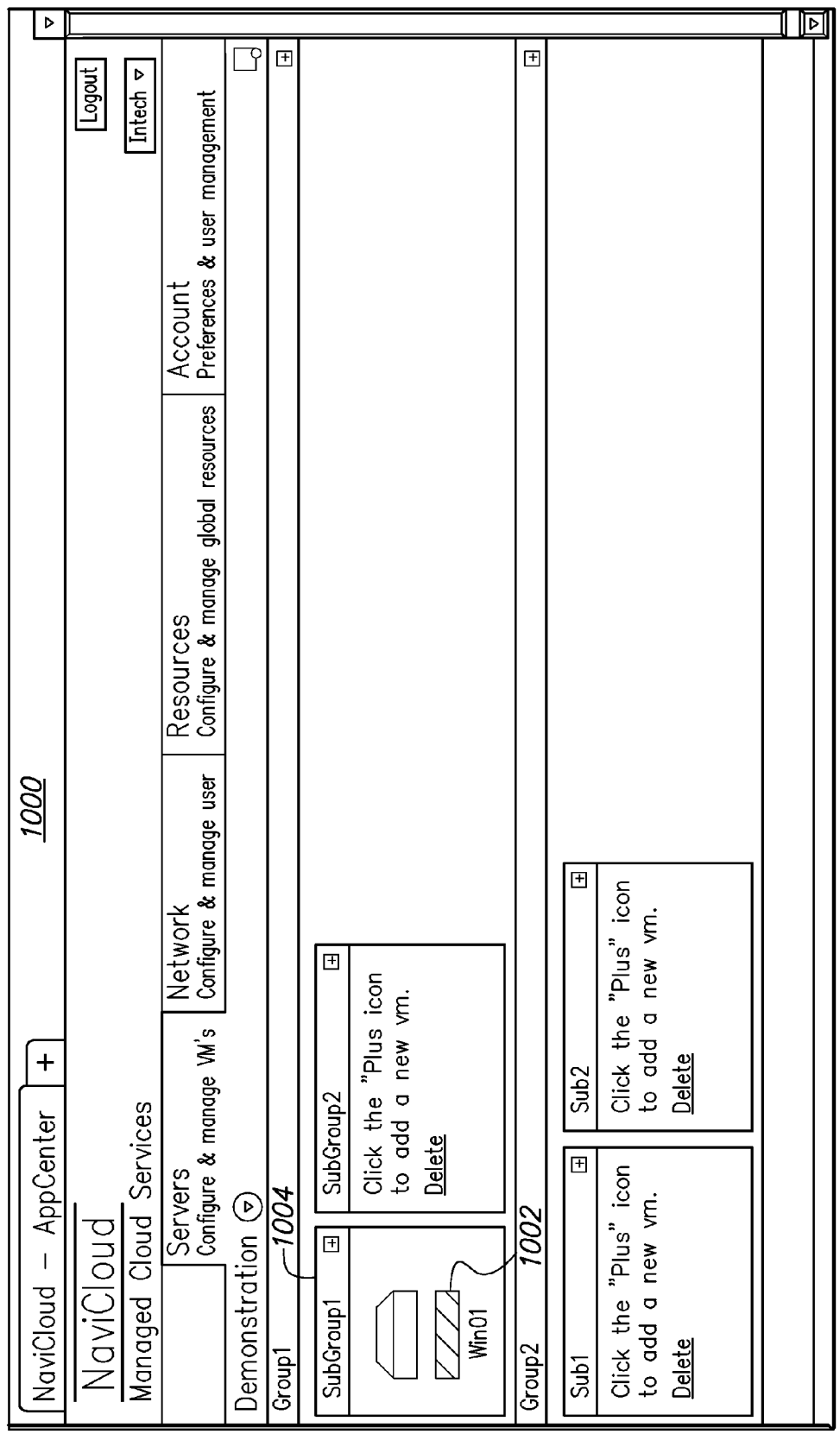
Figure 11:
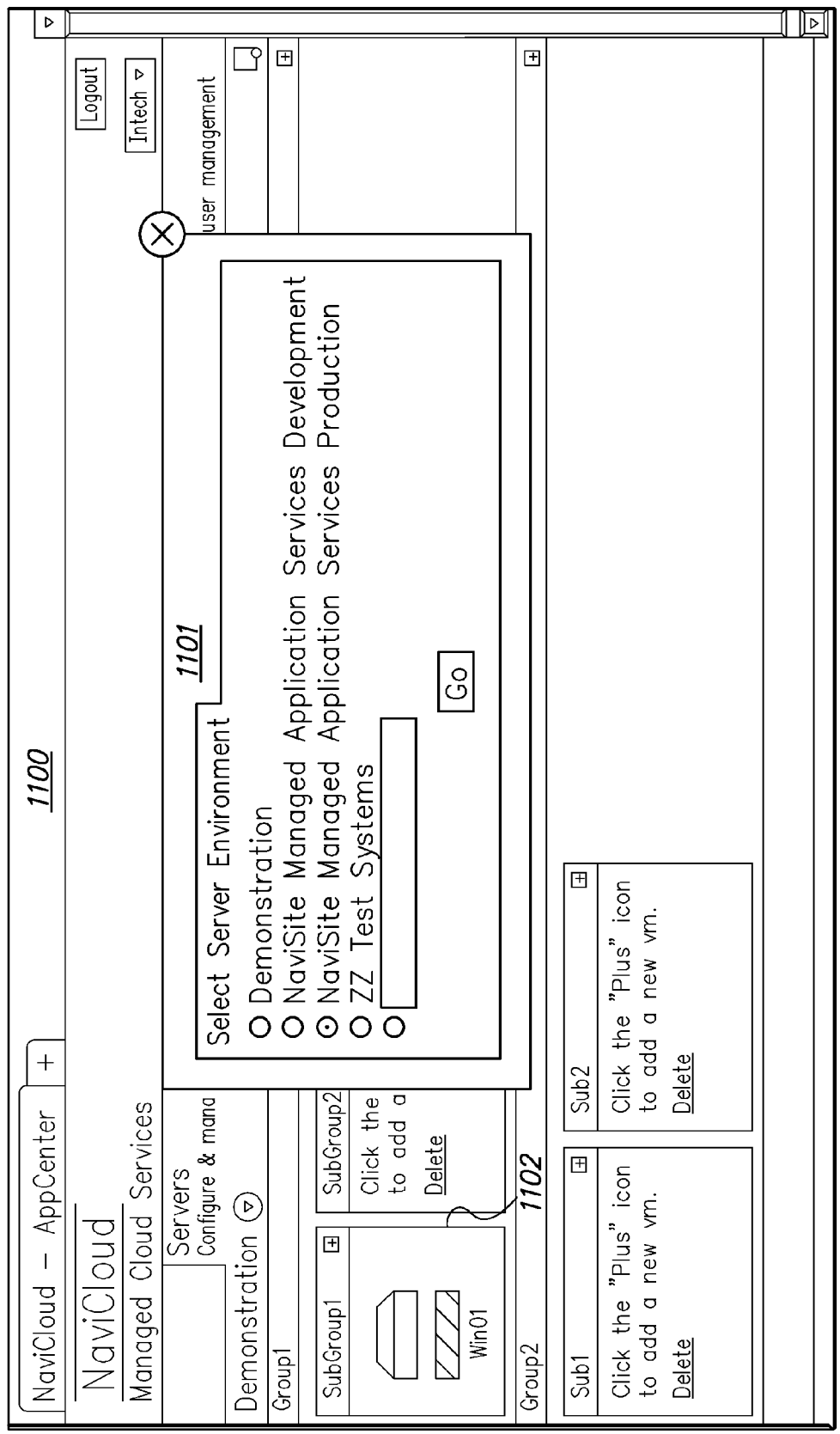

FIG. 5 shows a GUI screen 500 which a new user would see at the point in time where they were establishing their virtual data center using the system 102, i.e., the virtual equivalent of walking into an empty, physical data center. The system 102 provides three different types of containers for organizing virtual data center elements: environments, groups and subgroups. These types of containers can, collectively or individually, mirror any type of business structure which is typically used to organize IT resources in a data center, e.g., by function (marketing, finance, etc.), by business organization unit (division, corporate, human resources, etc.). FIG. 5 shows an environment "Demonstration" which is created using the GUI by, as shown in FIG. 6, an overlaid GUI control element 600 accessed via the "Servers" tab 302 from GUI screen 602. Returning to FIG. 5, once the environment "Demonstration" has been setup by the customer, it can then add one or more group containers by clicking on the plus icon 504. This user interface interaction results in a pop-up overlay item 700, seen in the GUI screen 702 of FIG. 7, wherein the user can add a new group of server(s), here called "Group 2".

Subgroup containers can be generated by, for example, a user or customer clicking on the interface element 704. This interaction results, for example, in another input overlay GUI element 800 being provided which enables the user to enter the name of the next subgroup from the exemplary GUI screen 802 in FIG. 8. Therein it can be seen that the environment "Demonstration" now has two groups (Group1 and Group2), wherein Group 1 has two subgroups, and Group2 has one subgroup (with another one in the process of being created). Once the basic structure of the virtual data center is established in terms of named environment, group(s) and subgroup(s), virtual machines can be added to the virtual data center.

Thus, within each subgroup, the user has the capability to add a new virtual machine (vm) by clicking on the "plus" icon 804 within each subgroup's box. Actuating user interface element 806 provides a command sent to web server 106 which results in a GUI screen such as screen 900 in FIG. 9 being generated on the user's browser. Therein an overlay 902 is displayed which enables a user to create a virtual server to be added to a subgroup. As shown, the user can, for example, input a name 904 for the virtual server, specify an operating system 906 from a drop down menu, select one of a plurality of templates from which the virtual server can be created 908, select a number of CPUs 910 that the virtual server should have, an amount of memory 912, a VLAN to which the virtual machine will be connected 914 and an IP address for the virtual machine 916.

Once the "Create" button is actuated by the user on overlay 902, signaling passes through system 102 to create the user-specified virtual machine. Creation of a virtual machine can, for example, be treated by system 102 as an asynchronous task and thus be signaled to application server 110 wherein the task manager, among other elements, operates to perform this task. The GUI reflects this creation process, as for example shown in GUI screen 1000 of FIG. 10, where the status bar 1002 having a "candy cane" fill indicates that the system 102 is in the process of creating the requested virtual machine to be disposed in subgroup container 1004. The process of creating the virtual machine may take a few minutes, depending upon the system 102's loading at the time of creation. Thus, the GUI generated by web server 106 is supported, at least in part, by AJAX which provides stateful connectivity such that the user can continue to navigate through the interface and perform other virtual data center management tasks while the virtual machine is being created, which enhances the customer's experience and productivity. This aspect of exemplary embodiments is further illustrated by the GUI screen 1100 in FIG. 11, wherein it can be seen that the user has navigated to select another environment via overlay 1101 while the virtual machine creation process continues as shown by the status bar in subgroup 1102.

Figure 12:
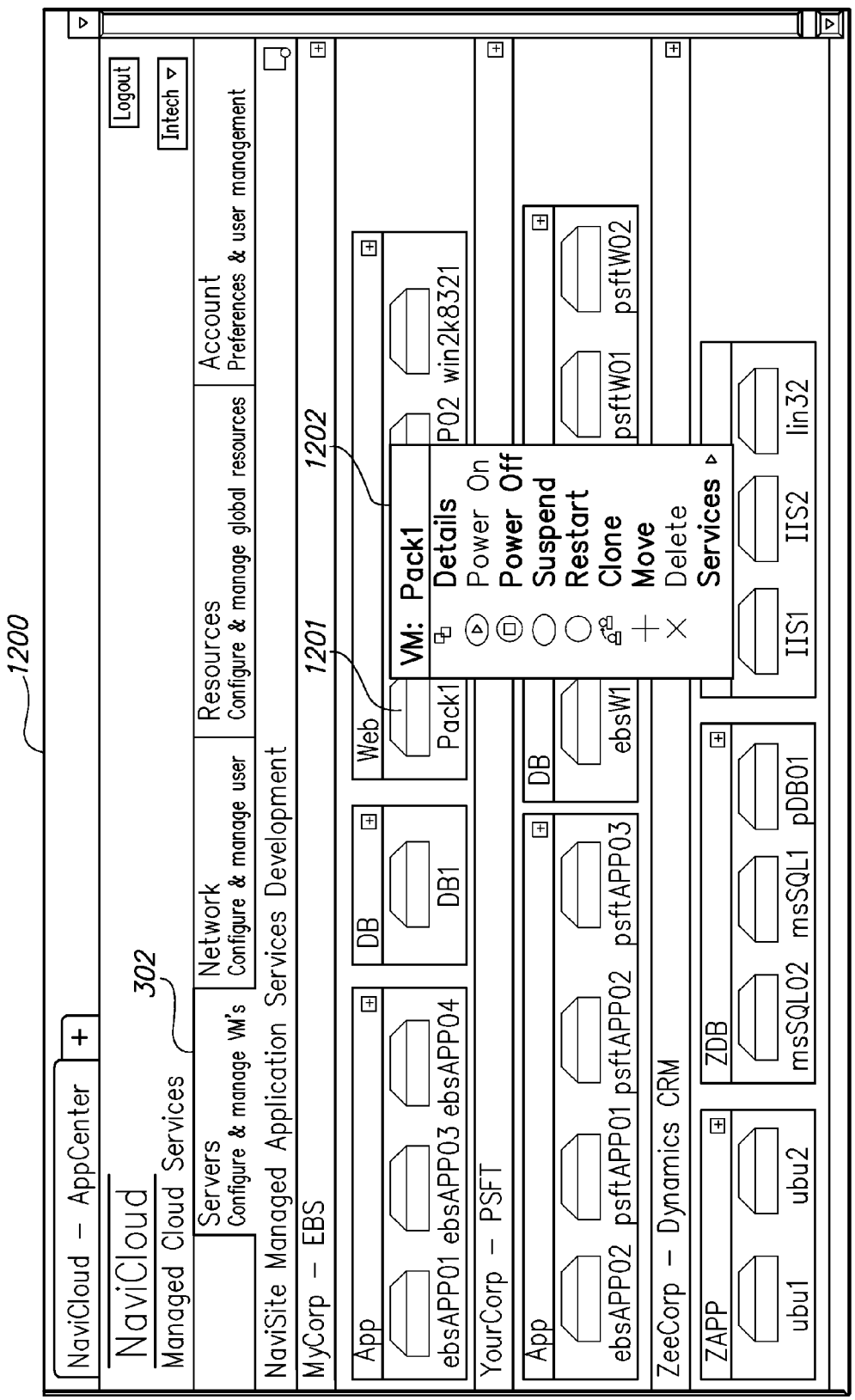

In addition to creating the organizational structure of their virtual data center, and populating that structure with virtual machines, a customer can, also from the "Servers" tab 302, access and control each virtual machine by right-clicking on the icon associated with a virtual machine to be controlled, as illustrated in FIG. 12. According to this exemplary embodiment, right clicking on the icon of the virtual machine "Pack1" 1201 in the "Web" subgroup of the "MyCorp-EBS" group of the "Navisite Managed Application Services Production" environment, results in an overlaid list box 1202 being displayed by the web server 106 on the user's browser within GUI screen 1200. This enable the user to control or view many aspects of the virtual machine 1201 including, as shown, details of the virtual machine, turning off (or on) the virtual machine, suspending the virtual machine, restarting the virtual machine, cloning the virtual machine, moving the virtual machine or other services. Right-clicking on either the groups or subgroups from the "Servers" tab view provides other context sensitive selection options for the user to manage options, or change aspects of, these containers.

Figure 13:
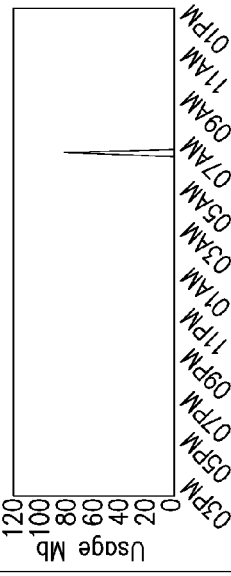
Figure 14:
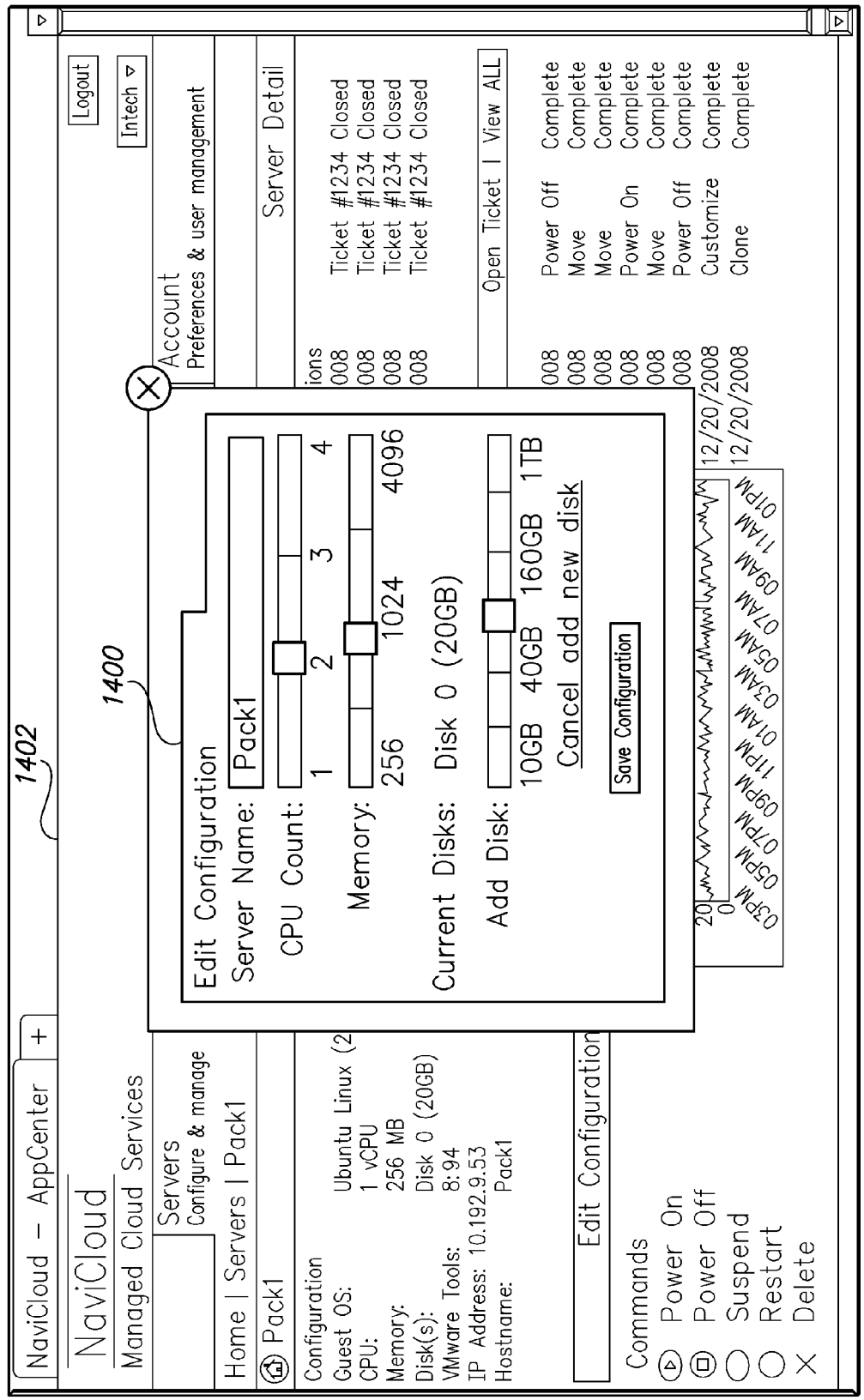
Figure 15:
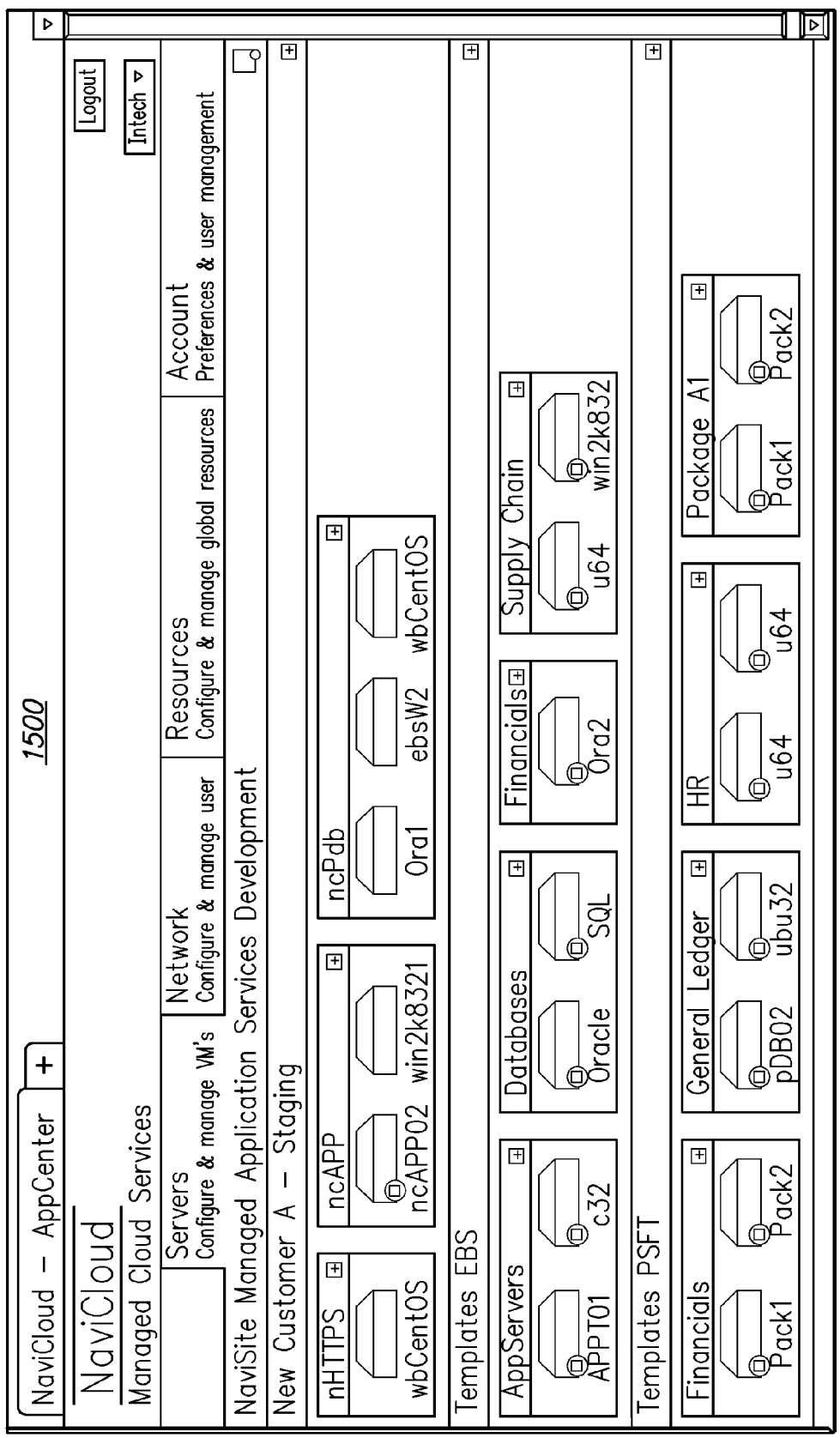
Figure 16:
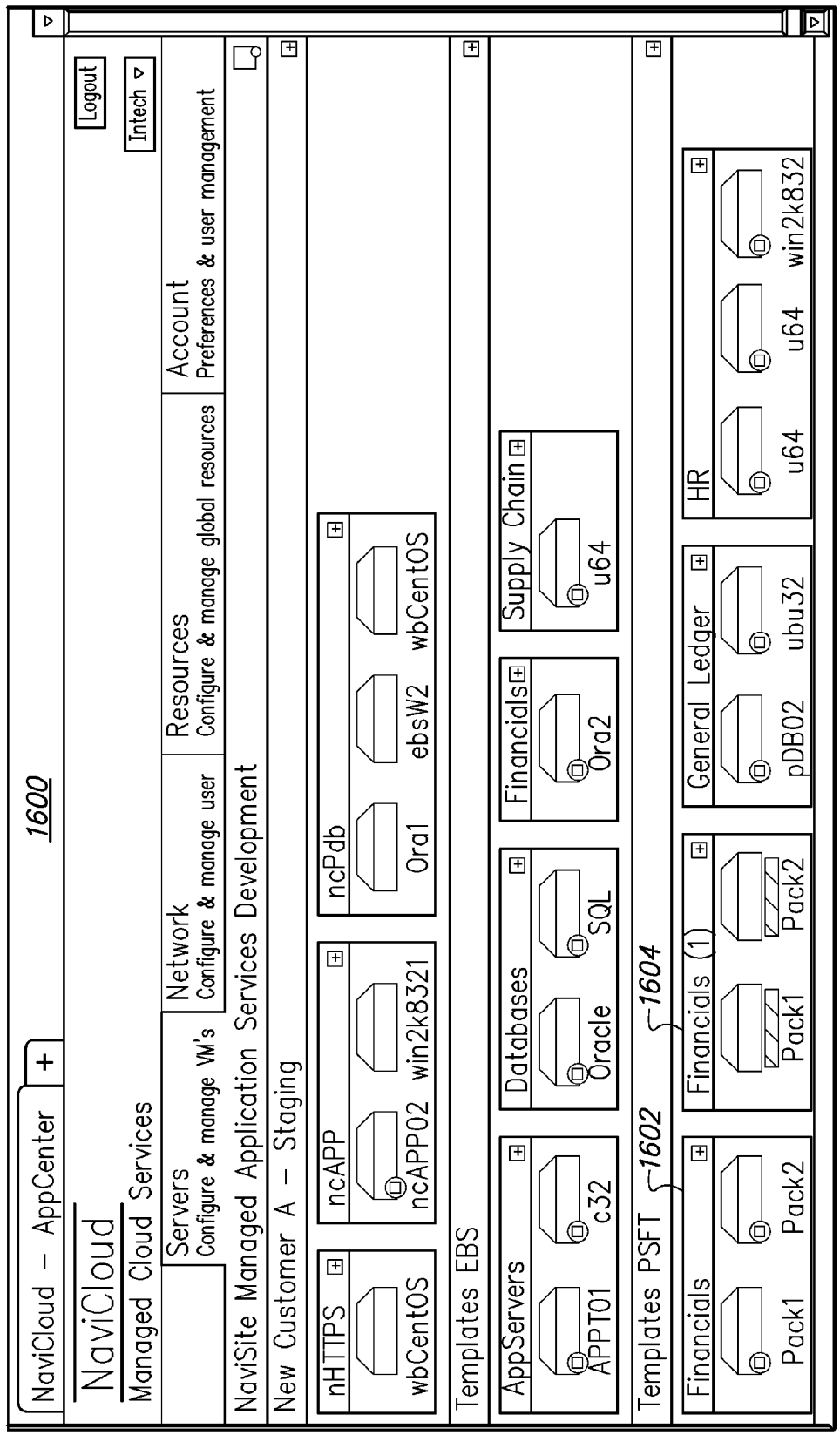

An example of how the right-click widget enables a user to quickly drill down to deeper levels of control over, for example, their virtual machines is shown in FIG. 13, wherein the "details" option in the drop down list 1202 has been selected resulting the display of GUI screen 1300 by the web server 106 on the user's browser. As seen, GUI screen 1300 provides a great deal of detail regarding, for example, the CPU and memory historical usage, the current configuration of the virtual machine, notifications which have been issued regarding this virtual machine and tasks which have been performed for this virtual machine. If, for example, the customer wants to change the configuration of the virtual machine Pack 1 1201, he or she can click the "Edit Configuration" link 1302, resulting in the display of an overlaid configuration GUI screen 1400, an example of which is provided as screen 1402 in FIG. 14. From overlay 1400, the user can, for example, change the name of the virtual machine, change the number of CPUs which it has, change the amount of memory with which it is provided, add or remove hard drives, and save the modified configuration.

All of the foregoing machine related interactions enable the user to configure, manage, and control the machines in their virtual data center according to exemplary embodiments without interacting with data center personnel in an easy and intuitive way. As mentioned previously, a customer can add new machines by way of templates. The Servers tab 302 can also provide graphical representations of physical machines which are available as template machines and that have various generic, base configuration as shown in GUI screen 1500 of FIG. 15. From these templates customers can clone machines, as shown in GUI screen 1600 in FIG. 16. Therein, by right clicking on the "Financials" subgroup 1602 (and thereby displaying the drop list which is not shown in FIG. 16, but was previously shown in FIG. 12), the user can command the system 102 to clone the subgroup 1602, resulting in the displayed, in progress, generation of the subgroup 1604. This capability substantially reduces the time needed to bring on line additional IT capability which is similar to that which already exists within a customer's virtual data center according to these exemplary embodiments.

Figure 17:
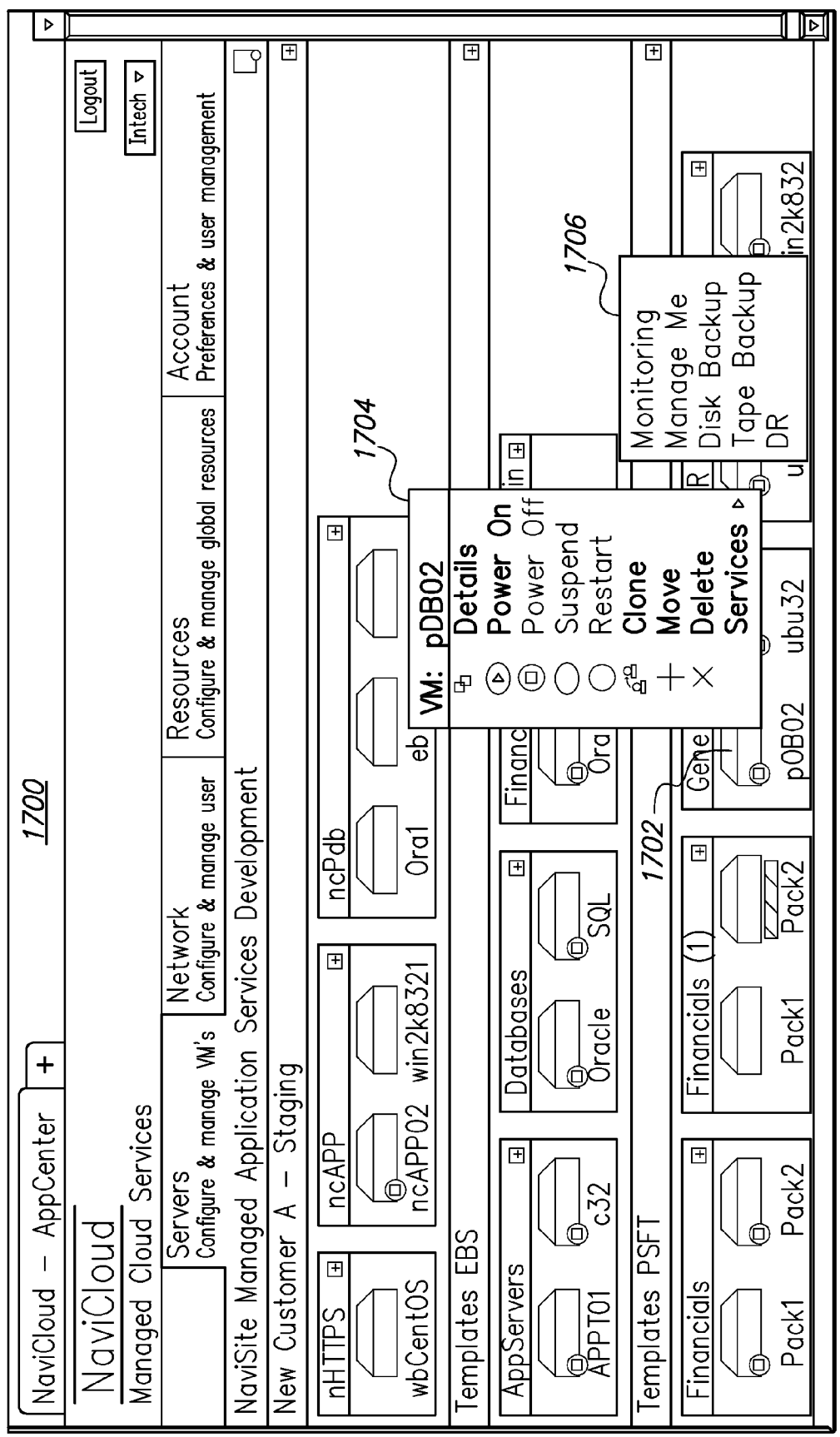
Figure 18:
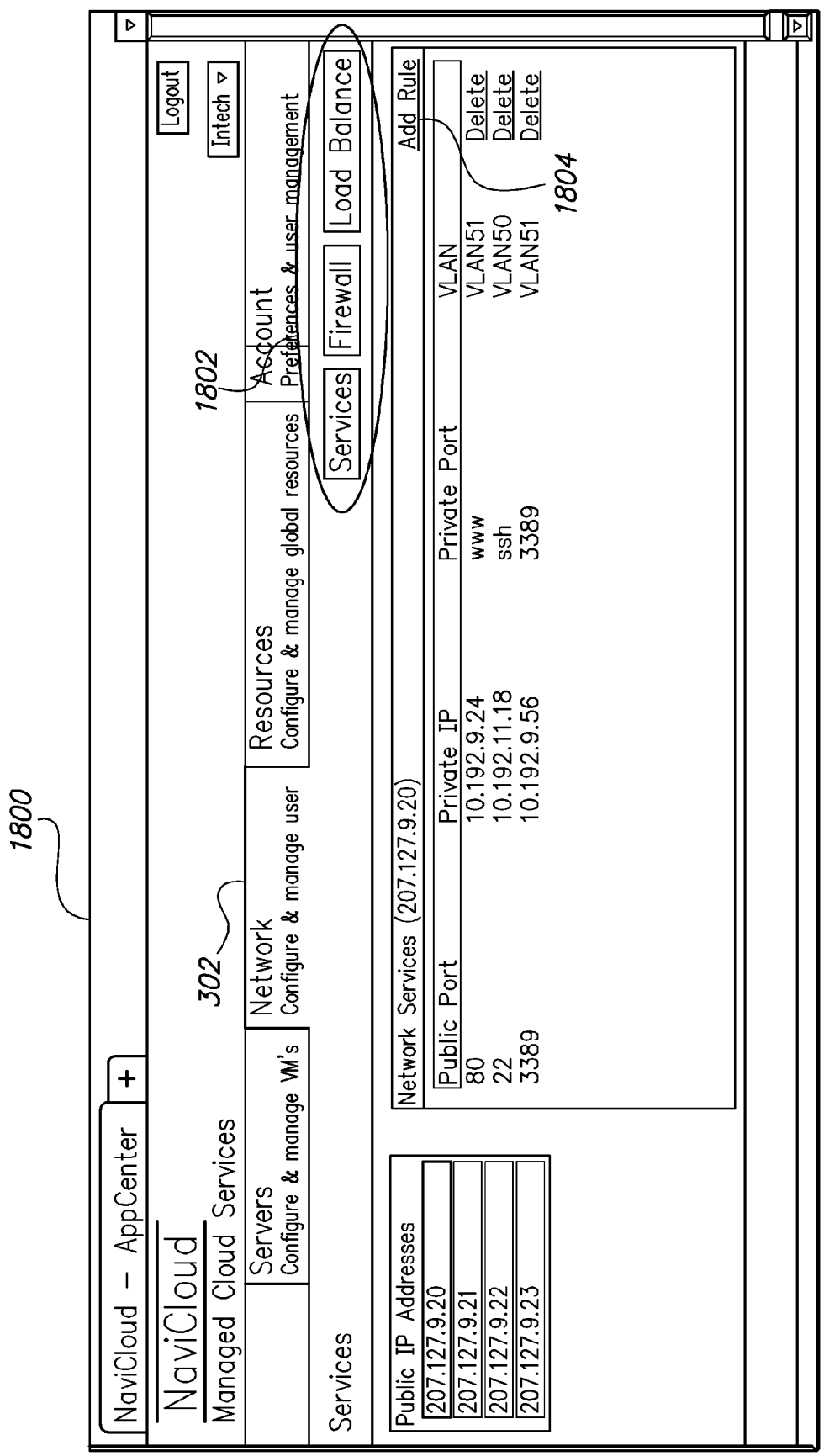
Figure 19:
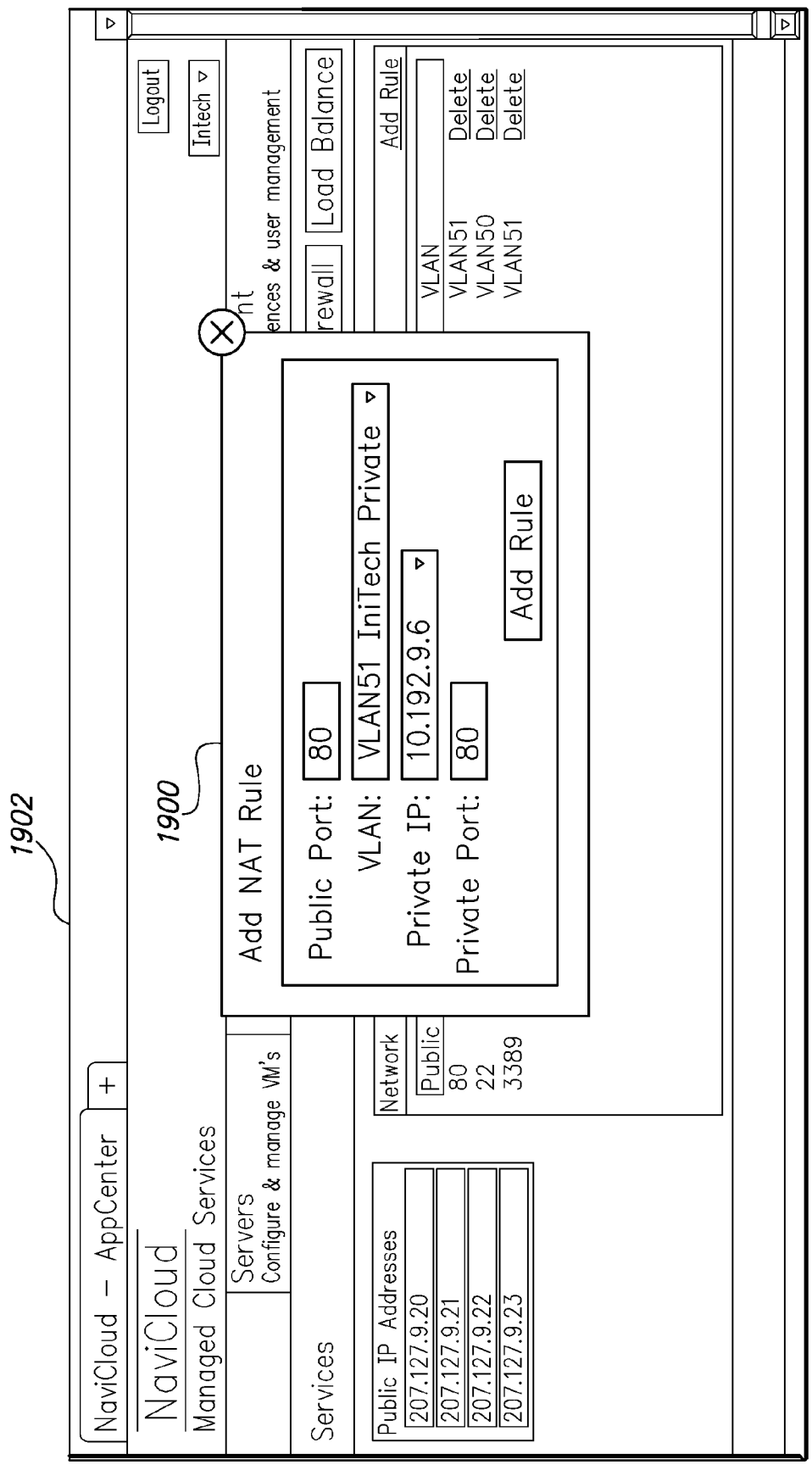

FIG. 17 depicts a GUI screen 1700 wherein the user has the ability to add managed services onto the virtual platform which they have created. Thus, for example, by right clicking on the icon 1702 associated with the virtual machine "DBO2", the drop list 1704 is displayed on the GUI. If a user points to the "Services" item in the drop list 1704, a corresponding drop list 1706 is displayed, from which the user can opt for the data center to provide certain managed services for this particular virtual machine, e.g., monitoring, management, disk backup or tape backup.

The foregoing discussion has focused primarily on GUI screens associated with the "Servers" tab 302. Now, starting with FIG. 18, the discussion moves on to aspects of virtual data center control and management which can be performed by users under the "Network" tab 302. Thus when, for example, a customer selects the "Network" tab 302, the system 102 can provide the user with the view 1800 shown in FIG. 18. Here, a sub tab "Services" 1802 has the focus and provides the network configuration information associated with this customer's virtual data center. From this view 1800, a user can expose the backend machine on any of the VLANs or private ports to the external world on a public IP address by adding actuating the "add a rule" user interface element 1804. This results, for example, in the display of an overlay user interface element 1900, as shown in the GUI screen 1902 in FIG. 19. By way of this user interface element 1900, a customer can establish a correspondence between public IP, public port, VLAN, private IP and private port as a NAT rule.

By actuating the "Firewall" sub tab 2000 in the "Networks" tab view, a customer can use system 102 to configure the firewalls within its virtual data center, as shown in GUI screen 2002 of FIG. 20. From this GUI screen 2002, a user can add or delete firewall rules. To add a rule, the user can actuate the "Add Rule" element 2004 to generate another overlay interface element 2100, an example of which is shown in FIG. 21. Using this overlay, the user can indicate a rule type (permit, deny), a source IP (either a specific IP address or a range of IP addresses), a destination IP (again either a single IP address or a range) and a particular protocol. Note that although Cisco firewalls are illustrated here as an illustrative example, any other manufacturers firewalls, e.g., Netgear, HP, etc., could be controlled similarly via different and corresponding APIs provided in interface 112 that enable system 102 to be technology agnostic.

Similarly, by actuating the "Load Balance" sub tab 2200 in the "Networks" tab view, a customer can use system 102 to perform load balancing among their IT resources as shown in GUI screen 2202. For example, a customer can add a load balancer to their network by clicking on the "Add Load Balancer" user interface element 2204, resulting in, for example, the overlay 2300 shown in FIG. 23 being displayed on the user's web browser. Using this overlay 2300, the user can enter a name, IP address, protocol, port number and method for the load balancer to be added. Once added to the load balancing GUI screen 2202, a customer can then assign one or more servers to each displayed load balancer.

Figure 24A:
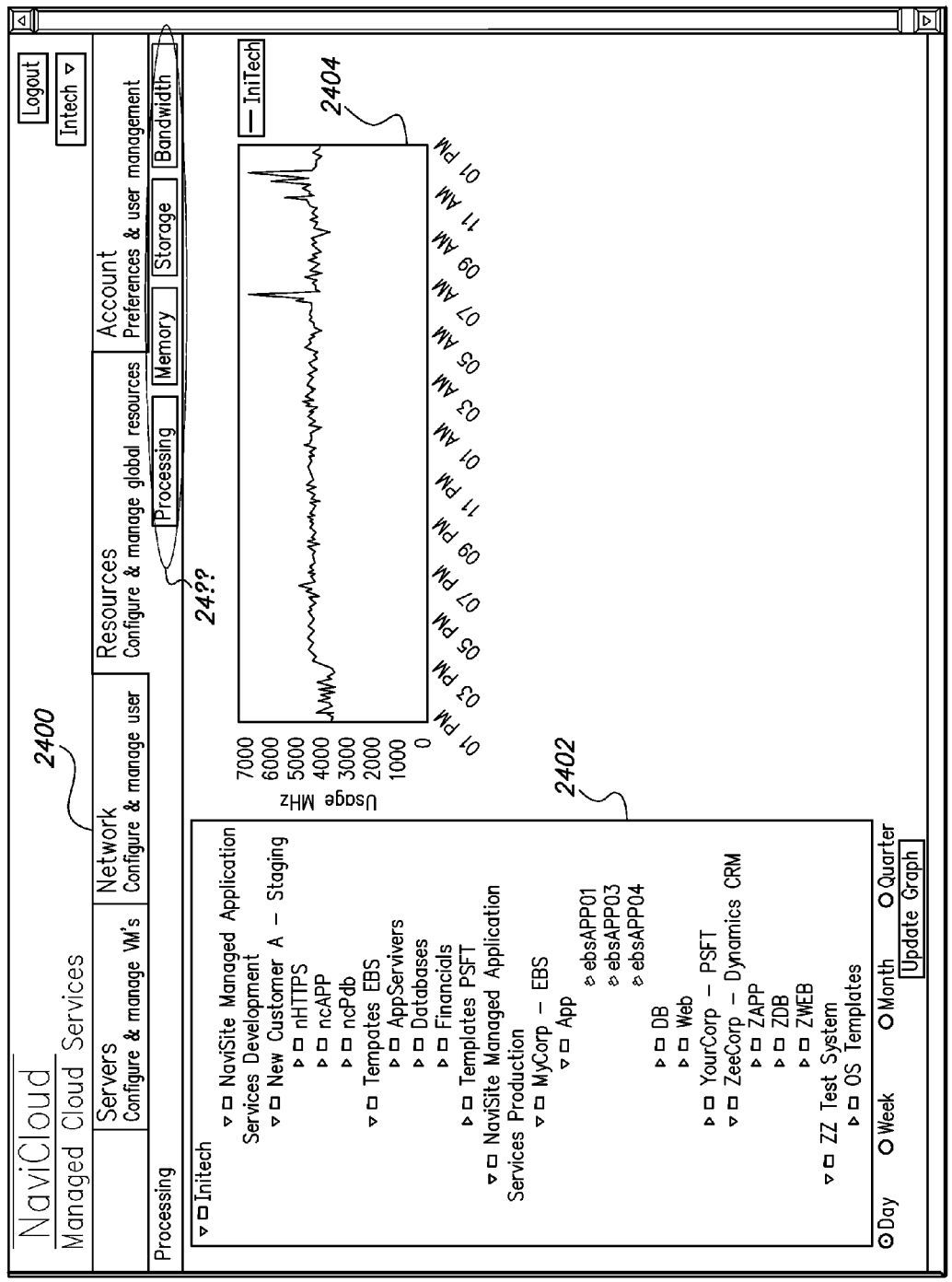

A third set of tools is provided to customers of the virtual data center via the "Resources" tab 302, an example of which is provided in GUI screen 2400 of FIG. 24(a). This view enables customers to review and evaluate the performance of the elements in their operative, virtual data center at various levels, e.g., in terms of processing, memory, storage or bandwidth at any given structural level. The directory-like tree 2402 provides the customer with the organization level (i.e., environment, group, subgroup, machine) at which the graph 2404 is displayed. Thus, in the illustrated example, the entire environment's processor usage for a day is displayed in graph 2404. However if the user was to, instead, select another tree element from tree 2402, that container or element's processor usage will be displayed. Similarly, the graph can switch to other parameters, e.g., memory usage, storage usage, or bandwidth usage, by selecting different sub tabs 2406.

Figure 24B:
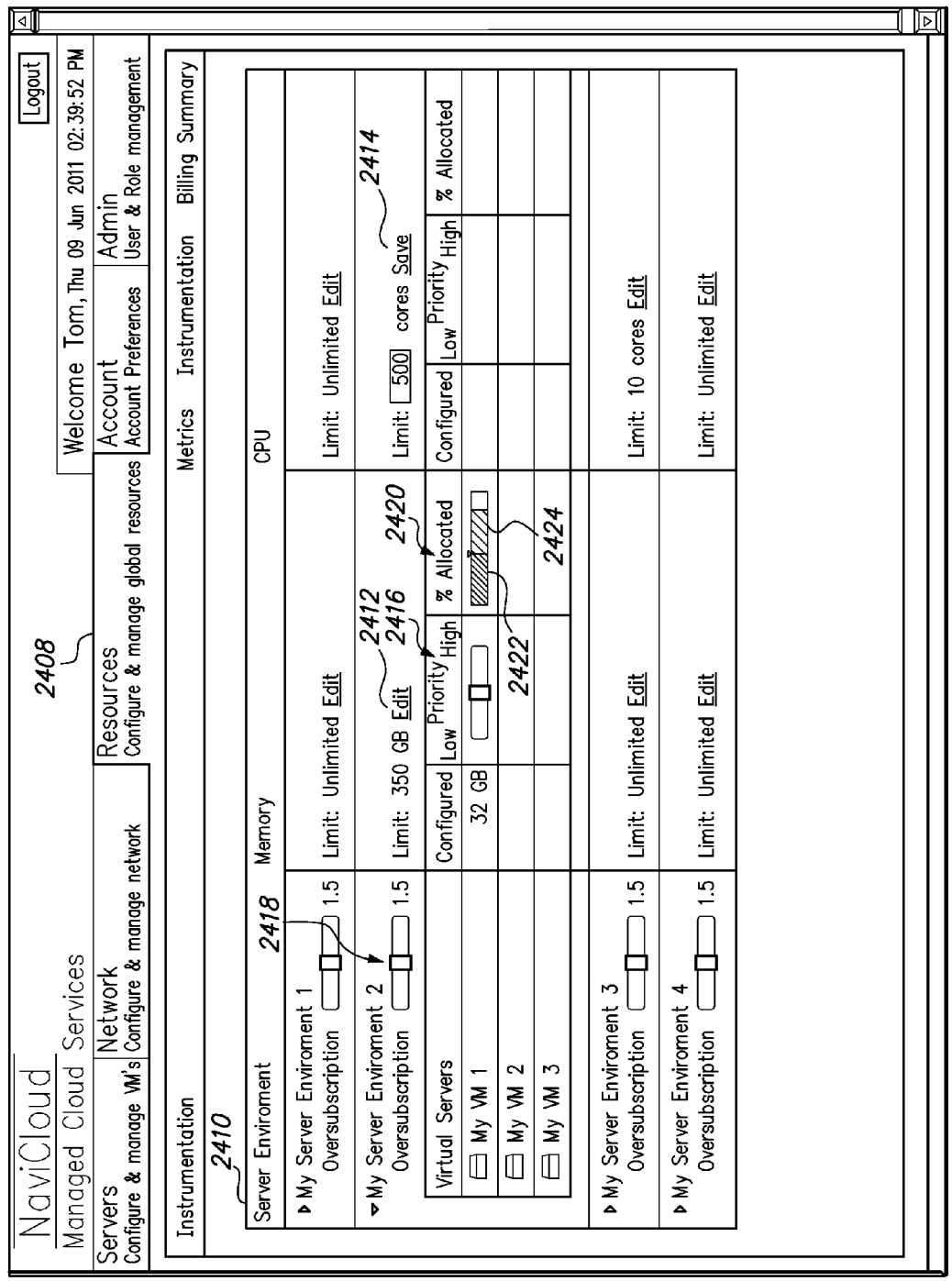

According to another embodiment, illustrated in FIG. 24(b), the "Resources" tab 2408 displayed by a GUI on a user's computing device can enable the user to manage a balance for their data center between price and performance. As mentioned above, exemplary embodiments described herein enable charging for data center resources on a highly granular basis, e.g., based on actual resources being used in real time rather than simply whether a machine is on or off. Thus through GUI control such as those shown in the "Instrumentation" sub-navigation element in FIG. 24(b), the user can self-impose the amount of data center resources which will be available in their virtual data center and, further, as their usage of those resources approaches the self-imposed limit(s), the user can prioritize the usage of the resources by the virtual machines in their data center.

More specifically, the UI screen illustrated in FIG. 24(b) provides for a number of different server environments one of which, Server Environment 2 2410, has been expanded to depict its details. According to this embodiment, the Resource Instrumentation screen enables the user to set limits on memory 2412 and CPU usage 2414 within this server environment, to control the relative priorities of virtual machines within the server environment, as exemplified by slider control 2416, and to control the (maximum) oversubscription ratio 2418. The limit controls 2412 and 2414 set the maximum total resource for the entire server environment, regardless of the number of machines which are established. The priority controls, e.g., slider 2416, enables the user to control how the system allocates resources within the environment, e.g., when there are insufficient resources to operate all processes/applications with their desired/requested resource allocation, e.g., due to the oversubscription of resources. An allocation display 2420 can be provided for each resource that shows how much of the associated resource this machine is currently using 2422 and how much of the associated resource this machine could be allocated given all of the other settings values currently established for this server environment. Regarding the oversubscription ratio control 2418, suppose that a virtual machine is configured with 32 GB of virtual RAM but the hypervisor layer is constrained to only actually grant 16 GB of physical RAM, then this is a 2:1 oversubscription ratio.

Figure 25:
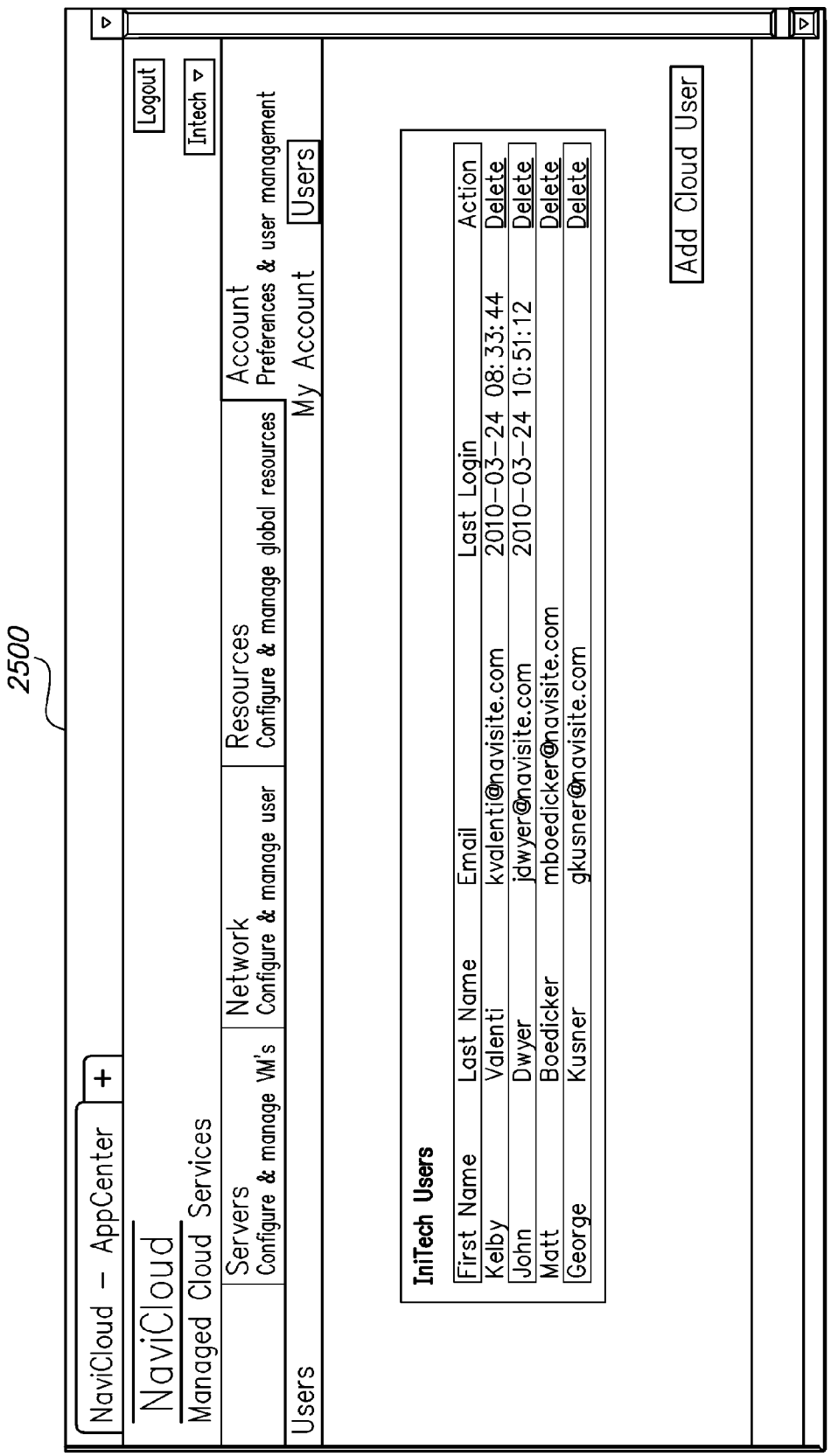
Figure 27:
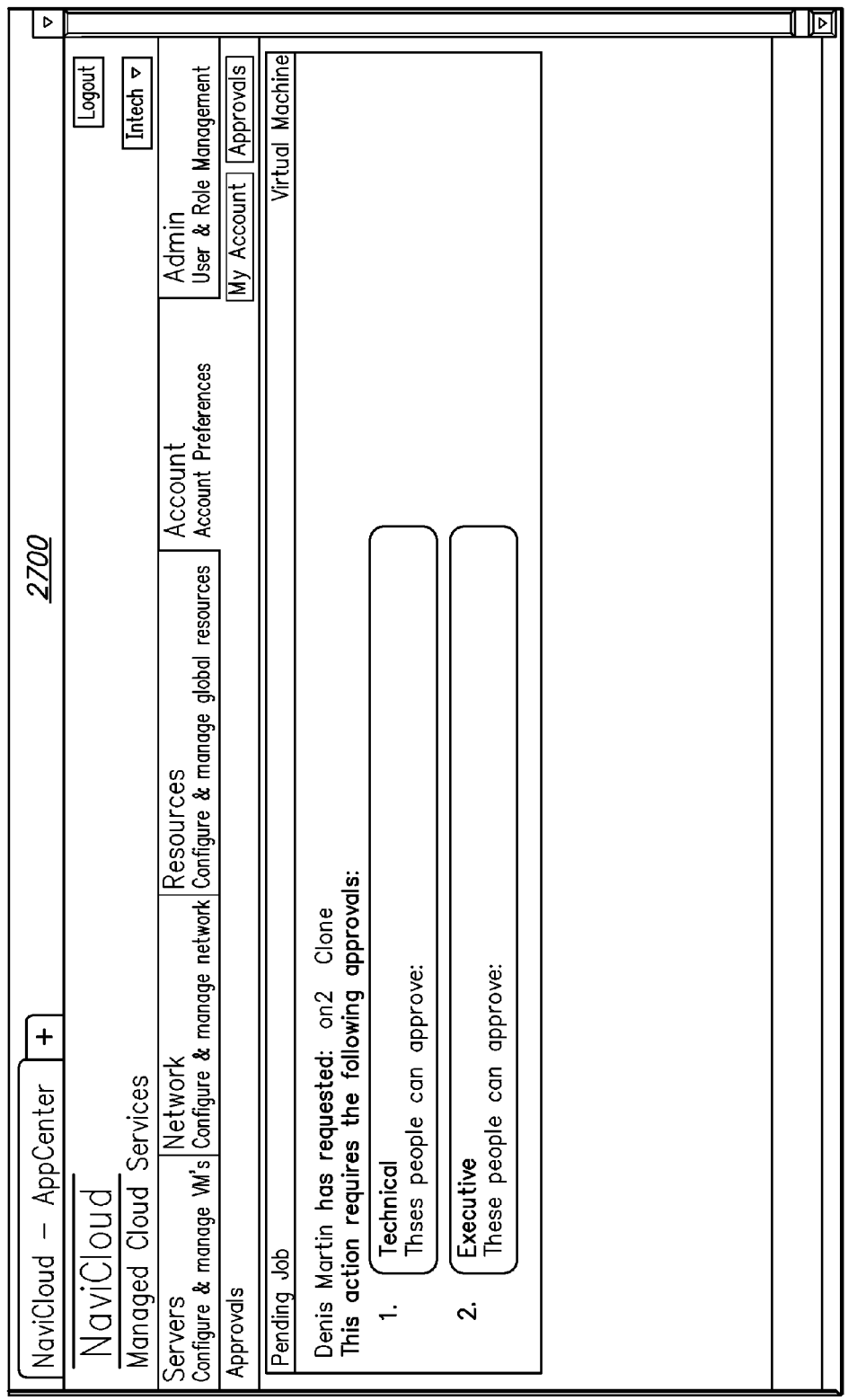

According to exemplary embodiments, roles based access controls can be provided to system 102 via the "Account" tab 302, (and/or an "Admin" tab 2600 to be described below) which will now be described starting with GUI screen 2500 of FIG. 25. Roles based access control enables, for example, enterprise level customers to selectively and precisely determine which users within that entity are entitled to have access to, or control over, the various elements in that entities' virtual data center. By selecting the Account tab 302, the customer can be presented with, for example, a list of users who are authorized to have any access (at all) to that customer's virtual data center from which initial control can be performed. More finely granulated control can be provided using, for example, a designation of approvers and matrix of which tasks those approvers are need to approve as, for example, shown in FIG. 26. Therein, a matrix of approvers versus tasks (actions) is displayed in GUI screen 2600 for a particular object, i.e., virtual machines. The customer can control which roles (e.g., financial, executive, administrative, technical) are needed to approve which tasks by checking the corresponding check boxes in the GUI.

For example suppose that the "Clone" function was determined by a particular customer to desirably require approval from someone in the customer entity having the role of "Technical" as well as someone in the customer entity having the role of "Executive", and that the customer had entered such settings in the system via GUI screen 2600. In such a case, when a user requests that a virtual machine, e.g., vm on2, be cloned, the system 102 could indicated that these approvals are needed as shown in GUI screen 2700 of FIG. 27.

Figure 28:
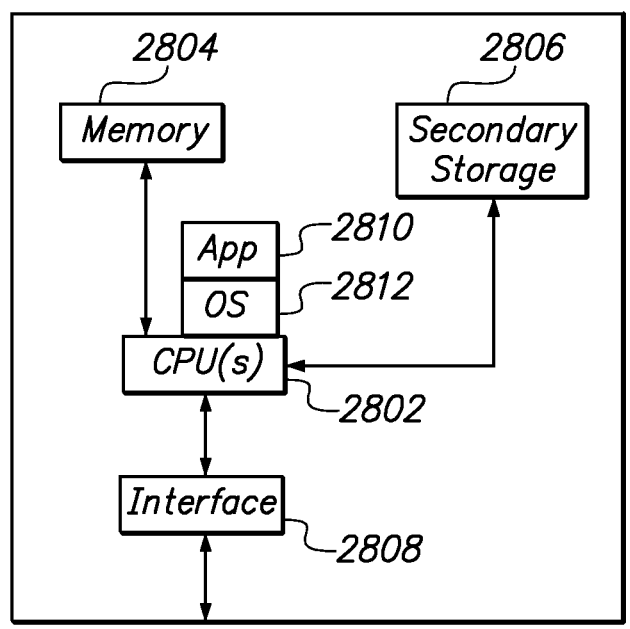
FIG. 28 depicts a terminal, server or other node which can be used in conjunction with these exemplary embodiments.

The exemplary embodiments described above provide for virtual data center control using a user interface, web servers and other nodes toward a hypervisor level and/or physical IT resources. An exemplary web server, end user terminal displaying the aforedescribed GUI or other node 2800 will now be described with respect to FIG. 28. Therein, device 2800 can contain a processor 2802 (or multiple processors/cores), memory 2804, one or more secondary storage devices 2806 and an interface unit 2808 to facilitate communications between device 2800 and the rest of the network. The processor(s) 2802 can run, for example, an operating system 2810 and an application 2812, e.g., a browser with which to generate the GUI described above on the client side or a web server application with which to generate the GUI described above on the server side.

Figure 29:
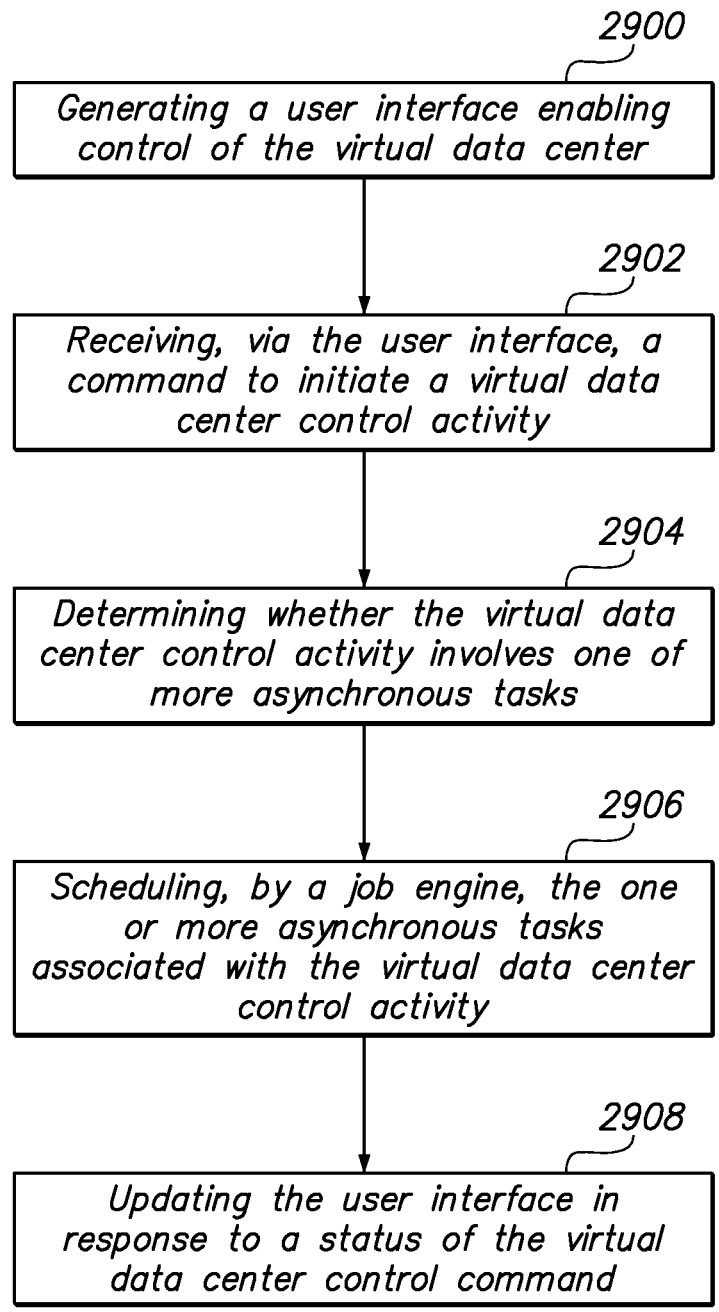
FIG. 29 is a flow chart illustrating a roles based access control method for a virtual data center according to an exemplary embodiment.

According to an embodiment, a roles based access control method for a virtual data center can include the steps illustrated in FIG. 29. Therein, at step 2900, a user interface is generated, e.g., by web server 106, which enables control of the virtual data center. A command is received, at step 2902, via the user interface, initiate a virtual data center control activity, e.g., any of those listed and/or described above. It can be determined, at step 2904, whether the virtual data center control activity involves one or more asynchronous tasks and, if so, then scheduling, by a job engine, the one or more asynchronous tasks associated with the virtual data center control activity at step 2906. The user interface is updated, at step 2908, in response to a status of the virtual data center control command, e.g., which update may indicate completion of a task or job, or provide an intermediate status update.

Figure 30:
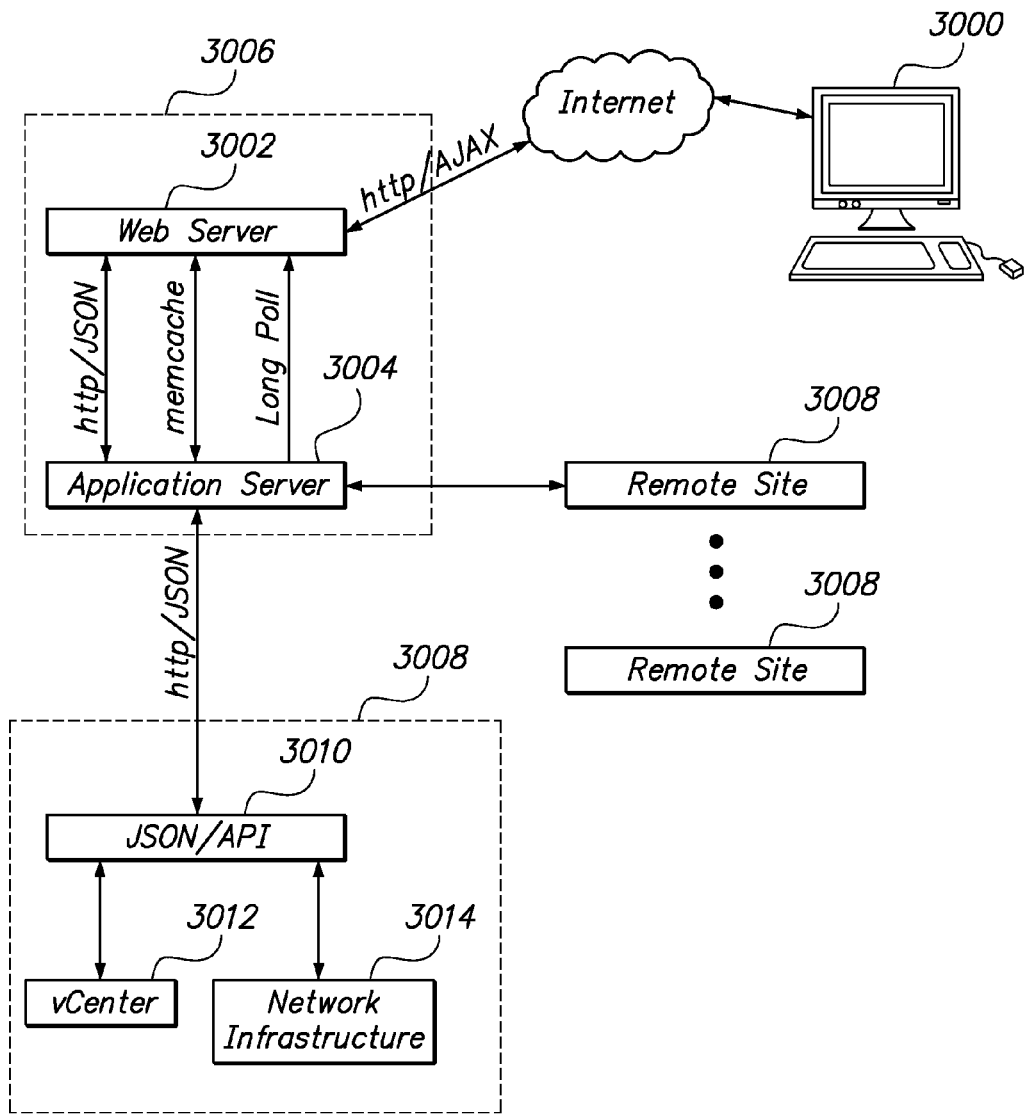
FIG. 30 illustrates an architecture for a data center configuration and control system according to another exemplary embodiment.

According to another exemplary embodiment, the architecture illustrated in FIG. 1 can be co-located or it may be distributed to various geographic centers as shown in FIG. 30. Therein, as with previous embodiments, one or more user's client devices, represented by a computer 3000, can connect to the web server 3002 via the Internet and can communicate therewith using HTTPS/AJAX signaling. In this embodiment, the web server 3002 and application server 3004 can be co-located in a single, central location as indicated by dotted box 3006. The remainder of the architecture can then be provided at either at the same location or at various remote locations, e.g., as denoted by blocks 3008.

As shown in FIG. 30, the web server 3002 can communicate with the application server 3004 using HTTP/JSON, memcache or Long Poll signaling. For example, consider the illustrative use case where the user who is initiating virtual data center control activities via computer 3000 wants to power on a particular virtual machine in his or her virtual data center. After actuating the corresponding UI control element, e.g., as illustrated in FIG. 12, an AJAX request to power on the identified VM would be transmitted by the UI and the computer 3000 and received by the web server 3002. The web server 3002 would then communicate this request with the application server 3004 via the HTTP/JSON link. The application server 3004 then communicates with its database, e.g., database 3200 associated with metrics subsystem 3202 as seen in FIG. 32, to establish a job record to represent this power on request. If roles based access control (RBAC) has been configured for power on jobs, then the relevant rules are consulted by the system to determine whether this job can proceed without further authorization. Once the job becomes executable, the job engine 3204 (which is part of the asynchronous job system 3206 in FIG. 32), communicates with the JSON/API module 3010 that is associated with that user's virtual data center 3012 to ultimately initiate a power on action in the vCenter 3012. More specifically, the task watcher 3208 will monitor the job progression and, when all of the task(s) associated with the power on request are complete, the task watcher 3208 will initiate signal sequence back to the user 3000's browser via the long poll response mechanism 3100 (see FIG. 31) in the web server 3002, whereupon the UI will indicate that the selected VM has been powered on.

To provide another use case wherein the user 3000 interacts with the network infrastructure 3014 instead of the vCenter 3012, consider a similar situation wherein the user via the UI/browser 3000 wants to configure a front-end IP NAT rule associated with a particular firewall in their network. In this case, similar signaling would occur to that described above except that the job engine 3204 would instruct the JSON/API 3010 (in the particular site 3008 which is local to that user's network infrastructure) to configure the firewall as instructed via the UI (see, e.g., FIG. 19). The JSON/API 3010 would then interact with the network infrastructure 3014 (i.e., network gear in FIG. 2) to set up the firewall.

Figure 31:
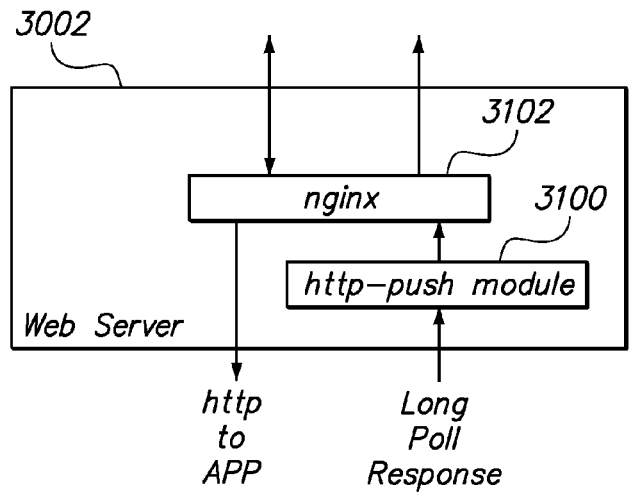
FIGS. 31 and 32 illustrate the architecture of FIG. 30 in more detail according to an exemplary embodiment.
Figure 32:
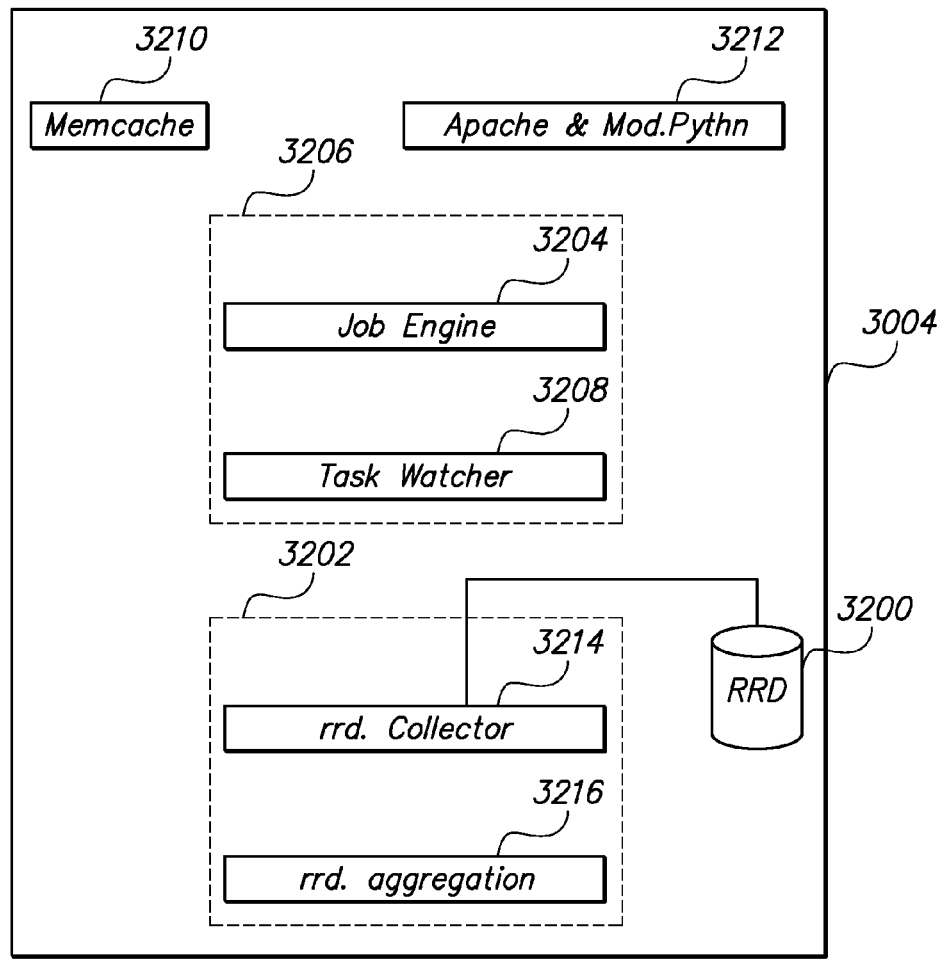

As will be apparent from the foregoing usage cases, FIGS. 31 and 32 provide more detail regarding web server 3002 and application server 3004, respectively, according to this embodiment. More specifically, in FIG. 31, the web server 3002 in this embodiment includes an nginx module 3102 which, among other things, serves the static content associated with the generation of the UI which is displayed on computer 3000 and is the endpoint for the HTTP long poll. The HTTP push module 3100 is an add-on to nginx module 3102 that provides the back channel notification mechanism for the long polling, i.e., to provide updates to the UI associated with previous activity requests.

Referring now to FIG. 32, the application server 3004, memcache 3210 provides a memory storage area that caches short-lived information that is communicated back and forth between the web server 3002 and the application server 3004. The APACHE/Mod. Python block 3212 represents the core execution environment for the web-backend, i.e., where the end user communications are handled to generate pages and handle AJAX requests in the application server 3004. As described above, the asynchronous job system 3206 includes the job engine 3204 and task watcher 3208 which cooperatively operate to break down and execute requests for virtual data center activities. For example, consider the activity of cloning a virtual machine. This job request would be decomposed into a number of tasks by the asynchronous job system 3206, e.g., job engine 3204 initiates cloning process, task watcher 3208 watches for the cloning to complete and then informs the job engine 3204, the job engine 3204 then powers on the resulting VM, the task watcher 3208 watches for power on of the VM and informs the job engine 3204, the job engine 3204 then initiates customization of that VM, the task watcher 3208 waits for customization to complete and informs the job engine 3204, the job engine then initiates a final reboot of the cloned VM, the task watcher 3208 waits for final reboot to occur and informs the job engine 3204, the job engine 3204 then registers the host name associated with the cloned VM, the task watcher 3208 watches for host name registration and informs the job engine 3204, the job engine 3204 then initiates signaling back to UI 300 that the requested cloning is complete.

The application server 3004 may also include a metrics subsystem 3202 or, alternatively, the metrics subsystem 3203 may be hosted on a separate machine. The metrics subsystem 3202 can, according to embodiments, collect and store resource consumption data for billing purposes and to enable the user to allocate resources as described above, e.g., processor consumption, memory consumption, storage consumption and/or bandwidth consumption. This data is collected and aggregated by, e.g., the rrd.collector module 3214 which collects the measurements and the rrd.aggregator module 3216 which aggregates the measurements and stores them in files in database 3200.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A virtual data center control system comprising:
a web server configured to generate a user interface (UI) which enables a user to remotely control elements of said virtual data center by instructing said virtual data center control system to perform an activity associated with any of said elements, said elements including virtual machines and at least one firewall;
an application server configured to receive a request to perform the activity from the web server and configured to execute one or more tasks which implement said activity, wherein said one or more tasks can be synchronous tasks or asynchronous tasks; and
an interface configured to receive synchronous task commands from said web server and said asynchronous task commands from said application server and configured to transform said synchronous task commands and said asynchronous task commands into at least one of a hypervisor layer command, and to transmit said transformed commands toward a hypervisor layer.

2. The virtual data center control system of claim 1, wherein said application server is further configured to generate a completed asynchronous task indication upon completion of one or more asynchronous tasks if said one or more asynchronous tasks are associated with the requested activity and further comprising:
wherein said UI includes UI control elements for enabling receipt of commands to perform at least one of the virtual data center functions of:
create a virtual machine,
configure a virtual machine,
configure a network of virtual machines,
establish role-based access to said virtual data center, and
monitor resource usage of said virtual data center.

3. The virtual data center control system of claim 1, wherein said application server further comprises:
a job engine module configured to receive an asynchronous task from the UI and to schedule execution of said asynchronous task as a plurality of component tasks; and
a task watcher module configured to monitor execution of said component asynchronous task commands and to generate an indication when all of the component asynchronous task commands associated with the asynchronous task are completed.

4. The virtual data center control system of claim 1, wherein said activity is one of create a virtual machine, configure a virtual machine, configure a network of virtual machines, establish role-based access to said virtual data center, and monitor resource usage of said virtual data center.

5. The virtual data center control system of claim 1, wherein said activity is any one of a plurality of activities including create a virtual machine, configure a virtual machine, configure a network of virtual machines, establish role-based access to said virtual data center, and monitor resource usage of said virtual data center, such that said UI includes at least one control element associated with each of said plurality of activities.

6. The virtual data center control system of claim 1, wherein the web server is further configured to generate a first UI screen which depicts UI elements associated with all of the virtual machines associated with the virtual data center, and to generate a second UI screen which depicts UI elements associated with exposure of a network element associated with the virtual data center to a public network.

7. The virtual data center control system of claim 6, wherein the web server is further configured to generate said first UI screen which depicts said UI elements associated with all of the virtual machines by displaying each of said virtual machines as belonging to one or more of three hierarchical containers, wherein said virtual machines are collected into groups and subgroups.

8. The virtual data center control system of claim 6, wherein the web server is further configured to generate the second UI screen which depicts UI elements associated with exposure of said network element associated with the virtual data center to a public network by displaying as said UI elements associated with exposure of said network element, a mechanism which enables a user to set a firewall rule type associated with at least one source IP address and at least one destination IP address.

9. The virtual data center control system of claim 1, wherein the web server is further configured to generate a UI screen which depicts UI elements associated with Roles Based Access Control (RBAC) of the virtual data center by displaying a matrix having, on one side, a plurality of virtual data center commands and having, on another side, a plurality of roles each associated with a different level of access to said virtual data center, and enabling a user to select, using said matrix, which of said plurality of roles have permission to actuate which of said plurality of virtual data center commands.

10. The virtual data center control system of claim 1, wherein the web server is further configured to generate a UI screen which depicts UI elements associated with resource control of a server environment including a first UI control element for controlling a maximum resource limit for the server environment, a second UI control element for controlling priority allocation of the resource for each machine disposed in the server environment and a third UI control element associated with an oversubscription ratio for the server environment.

11. The virtual data center control system of claim 1, wherein said elements further comprise at least one load balancer.

12. The virtual data center control system of claim 1, wherein the web server is further configured to generate a UI screen which depicts UI elements associated with resource control of a server environment including a first UI control element for controlling a maximum resource limit for the server environment.

13. A method for remotely controlling a virtual data center, the method comprising:
   generating, by a server, a user interface (UI) enabling control of said virtual data center, wherein said UI includes control elements which enable a user to control functions associated with virtual machines and at least one firewall;
   receiving, at said server via said UI, a command to initiate a virtual data center control activity associated with one of the virtual machines and at least one firewall, or a command to add a new virtual machine to said virtual data center;
   executing, by said server, one or more tasks to implement said virtual data center control activity;
   determining, by said server, that said virtual data center control activity starts with a synchronous activity associated with obtaining information associated with said new virtual machine to be added;
   receiving, at said server via said UI, said information;
   determining, by said server, that said virtual data control activity continues with an asynchronous activity associated with setting up said new virtual machine; and
   setting up, by said server, said new virtual machine using said information.

14. The method of claim 13, further comprising:
   determining whether said virtual data center control activity involves one or more asynchronous tasks;
   scheduling, by a job engine, said one or more asynchronous tasks associated with said virtual data center control activity; and
   updating said UI in response to a status of said virtual data center control command.

15. The method of claim 14, further comprising:
   displaying a fourth UI screen which enables a user to input said information including at least one of: a name for said new virtual machine, an operating system for said new virtual machine, a template from which to build said new virtual machine, a number of processors for said new virtual machine, an amount of memory for said new virtual machine, a VLAN to which said new virtual machine is to be connected and an IP address for said new virtual machine.

16. The method of claim 15, further comprising:
   displaying, proximate a UI element associated with said new virtual machine, a status bar indicating a status associated with the creation of said new virtual machine.

17. The method of claim 13, wherein said step of generating said UI further comprises:
   generating a first UI screen which depicts UI elements associated with all of the virtual machines associated with the virtual data center; and
   generating a second UI screen which depicts UI elements associated with exposure of a network element associated with the virtual data center to a public network.

18. The method of claim 17, wherein each of said first and second UI screens are accessible via associated tabs in said UI.

19. The method of claim 17, wherein said step of generating said first UI screen which depicts said UI elements associated with all of the virtual machines further comprises:
   displaying each of said virtual machines as belonging to one or more of three hierarchical containers, wherein said virtual machines are collected into groups and subgroups.

20. The method of claim 17, further comprising:
   displaying, as an overlay to said first UI screen, a plurality of options for controlling one of said virtual machines in response to a user input received while a cursor is disposed over a UI element associated with said one of said virtual machines.

21. The method of claim 20, wherein said plurality of options include: requesting details of said one of said virtual machines, powering on or off said one of said virtual machines, suspending said one of said virtual machines, restarting said one of said virtual machines, cloning said one of said virtual machines and moving said one of said plurality of virtual machines.

22. The method of claim 17, wherein said step of generating said second UI screen which depicts UI elements associated with exposure of said network element associated with the virtual data center to said public network further comprises:
   displaying as said UI elements associated with exposure of said network element, a mechanism which enables a user to establish a correspondence between a public IP address, public port, a VLAN, a private port and a private IP address as a network address translation (NAT) rule.

23. The method of claim 17, wherein said step of generating said second UI screen which depicts UI elements associated with exposure of said network element associated with the virtual data center to said public network further comprises:
   displaying as said UI elements associated with exposure of said network element, a mechanism which enables a user to set a firewall rule type associated with at least one source IP address and at least one destination IP address.

24. The method of claim 17, wherein said step of generating said second UI screen which depicts UI elements associated with exposure of said network element associated with the virtual data center to said public network further comprises:
   displaying as said UI elements associated with exposure of said network element, a mechanism which enables a user to assign one or more virtual machines to a load balancer.

25. The method of claim 17, further comprising:
   generating a third UI screen which depicts UI elements associated with Roles Based Access Control (RBAC) of the virtual data center by
   displaying a list of users who are authorized to issue commands to said virtual data center.

26. The method of claim 17, further comprising:
   generating a third UI screen which depicts UI elements associated with Roles Based Access Control (RBAC) of the virtual data center by displaying a matrix having, on one side, a plurality of virtual data center commands and having, on another side, a plurality of roles each associated with a different level of access to said virtual data center, and enabling a user to select, using said matrix, which of said plurality of roles have permission to actuate which of said plurality of virtual data center commands.

27. The method of claim 13, wherein the step of generating, by said server, said user UI enabling control of said virtual data center further comprises:

generating a UI screen which depicts UI elements which associated with resource control of a server environment including a first UI control element for controlling a maximum resource limit for the server environment, a second UI control element for controlling priority allocation of the resource for each machine disposed in the server environment and a third UI control element associated with an oversubscription ratio for the server environment.

28. A non-transitory, computer-readable medium containing a plurality of program instructions stored thereon which, when executed by a processor or computer, perform the functions comprising:

generating a user interface (UI) enabling control of a virtual data center;

receiving, via said UI, a command to initiate a virtual data center control activity;

determining whether said virtual data center control activity involves one or more asynchronous tasks;

scheduling, by a job engine, said one or more asynchronous tasks associated with said virtual data center control activity;

updating said UI in response to a status of said virtual data center control command;

receiving, as said command, a command to add a new virtual machine to said virtual data center;

determining that said virtual data center control activity starts with a synchronous activity associated with obtaining information associated with said new virtual machine to be added;

receiving said information;

determining that said virtual data control activity continues with an asynchronous activity associated with setting up said new virtual machine; and setting up said new virtual machine using said information.

29. The non-transitory, computer-readable medium of claim 28, wherein said step of generating said UI further comprises:

generating a first UI screen which depicts UI elements associated with all of the virtual machines associated with the virtual data center;

generating a second UI screen which depicts UI elements associated with exposure of a network element associated with the virtual data center to a public network; and generating a third UI screen which depicts UI elements associated with Roles Based Access Control (RBAC) of the virtual data center.

30. The non-transitory, computer-readable medium of claim 29, wherein each of said first, second and third UI screens are accessible via associated tabs in said UI.

31. The non-transitory, computer-readable medium of claim 29, wherein said step of generating said first UI screen which depicts said UI elements associated with all of the servers further comprises:

displaying each of said servers as belonging to one or more of three hierarchical containers, wherein said servers are collected into groups and subgroups.

32. The non-transitory, computer-readable medium of claim 29, further comprising:

displaying, as an overlay to said first UI screen, a plurality of options for controlling one of said virtual machines in response to a user input received while a cursor is disposed over a UI element associated with said one of said virtual machines.

33. The non-transitory, computer-readable medium of claim 29, wherein said step of generating said second UI screen which depicts UI elements associated with exposure of said network element associated with the virtual data center to said public network further comprises:

displaying as said UI elements associated with exposure of said network element, a mechanism which enables a user to establish a correspondence between a public port, a VLAN, a private port and a private IP address as a network address translation (NAT) rule.

34. The non-transitory, computer-readable medium of claim 29, wherein said step of generating said second UI screen which depicts UI elements associated with exposure of said network element associated with the virtual data center to said public network further comprises:

displaying as said UI elements associated with exposure of said network element, a mechanism which enables a user to set a firewall rule type associated with at least one source IP address and at least one destination IP address.

35. The non-transitory, computer-readable medium of claim 29, wherein said step of generating said second UI screen which depicts UI elements associated with exposure of said network element associated with the virtual data center to said public network further comprises:

displaying as said UI elements associated with exposure of said network element, a mechanism which enables a user to assign one or more virtual machines to a load balancer.

36. The non-transitory, computer-readable medium of claim 29, wherein said step of generating said third UI screen which depicts UI elements associated with RBAC of the virtual data center further comprises:

displaying a list of users who are authorized to issue commands to said virtual data center.

37. The non-transitory, computer-readable medium of claim 29, wherein said step of generating said third UI screen which depicts UI elements associated with RBAC of the virtual data center further comprises:

displaying a matrix having, on one side, a plurality of virtual data center commands and having, on another side, a plurality of roles each associated with a different level of access to said virtual data center, and enabling a user to select, using said matrix, which of said plurality of roles have permission to actuate which of said plurality of virtual data center commands.

38. The non-transitory, computer-readable medium of claim 28, further comprising:

displaying a fourth UI screen which enables a user to input said information including at least one of: a name for said new virtual machine, an operating system for said new virtual machine, a template from which to build said new virtual machine, a number of processors for said new virtual machine, an amount of memory for said new virtual machine, a VLAN to which said new virtual machine is to be connected and an IP address for said new virtual machine.

39. The non-transitory, computer-readable medium of claim 38, further comprising:

displaying, proximate a UI element associated with said new virtual machine, a status bar indicating a status associated with the creation of said new virtual machine.

40. The non-transitory, computer-readable medium of claim 38, wherein said plurality of options include: requesting details of said one of said virtual machines, powering on or off said one of said virtual machines, suspending said one of said virtual machines, restarting said one of said virtual machines, cloning said one of said virtual machines and moving said one of said plurality of virtual machines.

* * * * *